US005929139A

United States Patent [19]

Mori et al.

[11] Patent Number: 5,929,139

[45] **Date of Patent: *Jul. 27, 1999**

[54] METHOD FOR PRODUCTION OF MICROFINE COLORED PARTICLES AND ELECTROPHOTOGRAPHIC TONER, USING THE PARTICLES

[75] Inventors: Yoshikuni Mori, Takatsuki; Mitsuo Kushino, Minoo; Hideki Oishi, Suita; Tadahiro Yoneda, Ibaraki, all of Japan

[73] Assignee: Nippon Shokubai Co., Ltd.

[ * ] Notice: This patent is subject to a terminal disclaimer.

[21] Appl. No.: 08/947,359

[22] Filed: Oct. 8, 1997

Related U.S. Application Data

[60] Continuation of application No. 08/671,816, Jun. 25, 1996, abandoned, which is a division of application No. 08/082,365, Jun. 28, 1993, Pat. No. 5,559,168, which is a continuation-in-part of application No. 07/734,787, Jul. 23, 1991, abandoned, which is a continuation-in-part of application No. 07/400,065, Aug. 29, 1989, Pat. No. 5,080,992.

[30] Foreign Application Priority Data

| | | | |
|---|---|---|---|
| Aug. 30, 1988 | [JP] | Japan | 63-213827 |
| Apr. 17, 1989 | [JP] | Japan | 1-95419 |
| Jul. 14, 1990 | [JP] | Japan | 5-195514 |

[51] Int. Cl.[6] .................... G03G 9/08; C08J 3/12

[52] U.S. Cl. .................... 523/334; 523/205; 523/326; 523/332; 523/333; 523/335; 528/486; 528/491; 528/499; 430/109

[58] Field of Search .................... 430/109; 523/205, 523/332, 335, 326, 333, 334; 528/486, 491, 499

[56] References Cited

U.S. PATENT DOCUMENTS

| | | | |
|---|---|---|---|
| 4,983,488 | 1/1991 | Tan et al. | 524/803 |
| 5,080,992 | 1/1992 | Mori et al. | 430/111 |
| 5,364,722 | 11/1994 | Tanikawa et al. | 430/109 |
| 5,403,693 | 4/1995 | Patel et al. | 430/111 |
| 5,559,168 | 9/1996 | Mori et al. | 430/109 |

*Primary Examiner*—Andrew E. C. Merriam
*Attorney, Agent, or Firm*—Omri M. Behr, Esq

[57] ABSTRACT

A method for the recovery of microfine suspended particles from a suspension medium, characterized by subjecting a polymeric monomer suspended in a suspension medium to suspension polymerization thereby forming microfine globular particles in the suspension solution, adding microfine water-insoluble particles to said suspension solution of microfine globular particles thereby inducing cohesion of said microfine globular particles, and separating said microfine globular particles in the form of an aggregate from said suspension solution filtration.

4 Claims, 1 Drawing Sheet

METHOD FOR PRODUCTION OF MICROFINE COLORED PARTICLES AND ELECTROPHOTOGRAPHIC TONER, USING THE PARTICLES

This application is a continuation of application Ser. No. 08/671,816, filed Jun. 25, 1996, now abandoned which is a Division of Ser. No. 08/082,365 filed Jun. 28, 1993, now U.S. Pat. No. 5,559,168 which is a CIP of Ser. No. 07/734,787 filed Jul. 23, 1991, now abandoned, which is a CIP of Ser. No. 07/400,065 filed Aug. 29, 1989, now U.S. Pat. No. 5,080,992.

BACKGROUND OF THE INVENTION

1. Field of the Invention

This invention relates to a method for the production of microfine colored particles and an electrophotographic toner using the microfine colored particles obtained by this method. More particularly, this invention relates to a method for the production of microfine colored particles each having a coloring agent uniformly dispersed therein, enjoying a modified particle surface, and promising to find utility as a coloring agent in toners, coating materials, inks, molded articles of resin, etc. and an electrophotographic toner produced by using the microfine colored particles and enabled, when used as a toner in a printing device such as a laser printer or a liquid crystal printer, to form a clear image.

This invention relates to a method for the recovery of microfine globular particles formed mainly of resin from a suspension. To be more specific, this invention relates to a method for efficient recovery from a suspension of microfine globular particles obtained by the suspension polymerization method, for example.

2. Description of the Prior Art

The electrophotographic method comprises forming an electric latent image on a photosensitive material which is made of such a photoconductive material as selenium, zinc oxide, or cadmium sulfide, developing the latent image with a powder developer, transferring the developed image to a paper, and fixing the image on the paper.

Heretofore, the tone user for the development of the latent image in electrophotography has been generally produced by melting, mixing, and dispersing a coloring agent and other additives (such as a charge controlling agent, an offset preventing agent, and a lubricant) in a thermoplastic resin, solidifying the resultant dispersion, pulverizing the solid, classifying the produced particles, and collecting microfine colored particles of a desired particle diameter.

The method which produces a toner in accordance with the pulverizing step as described above, however, entails various drawbacks. Firstly, it necessitates numerous steps including the step of producing a resin, the step of mixing this resin with a coloring agent and other additives, the step of pulverizing the resultant solid mixture, and the step of classifying the produced particles and collecting microfine colored particles of a desired particle diameter and, therefore, requires use of as many devices as these steps. The toner which is produced by this method is expensive as a necessary consequence. Particularly, the step of classification constitutes itself an indispensable requirement for the production of a toner having particle diameters in a range optimum for the formation of an image enjoying high clarity and suffering sparingly from the phenomenon of fogging. It nevertheless has a problem of deficiency in productional efficiency and yield. Secondly, in the step of mixing, it is extremely difficult for the coloring agent and other additives to be uniformly dispersed in the resin. The toner produced by this method, therefore, suffers from inferior dispersion of the coloring agent, the charge controlling agent, etc. and consequent lack of uniformity of triboelectric characteristic among component particles and inevitable decline of resolution. In the future, these problems will gain all the more in prominence as a growing impetus is given to the trend of these toners toward particle diameter reduction which forms an indispensable requirement for the formation of images of high quality. The existing pulverizing devices are limited in ability to allow particle diameter reduction for such toners. Even if they are capable of producing a toner of a reduced particle diameter, the toner produced thereby at all still suffers from heavy ununiformity of the amount of charging due to inferior dispersion of the coloring agent and the charge controlling agent.

For the elimination of various drawbacks observed in the toner produced by the method of pulverization mentioned above, various methods for the production of a toner by the use of the emulsion polymerization technique or the suspension polymerization technique have been proposed (Japanese Patent Publications SHO 36(1961)-10,231, SHO 43(1968)-10,799, SHO 47(1972)-518,305, SHO 51(1976)-14,895, etc.). These methods invariably resort to a procedure of synthesizing a toner containing a coloring substance in one step of subjecting to emulsion or suspension polymerization a polymeric monomer incorporating therein the coloring substance such as carbon black and other additives. These method are capable of mending the drawbacks of the convention pulverizing method to a noticeable extent. Since they include absolutely no step of pulverization, they find no use for improvement of brittleness of the produced toner. Further, since the individual particles of the produced toner have a globular shape and excel in flowability, they enjoy uniformity of triboelectric characteristic. The method for the production of a toner by the technique of polymerization, however, has a problem of its own. Firstly, since such hydrophilic substances as a dispersant and a surfactant which are used in the process of polymerization are not completely removed in the step of washing and are suffered to persist in the toner particle surface, the charging property of the produced toner is susceptible of the influence of the environment. Secondly, since the toner particles produced by the technique of polymerization have a spheric shape and a very smooth surface, the toner deposited fast on the sensitive material is not easily removed and the sensitive material is consequently compelled to suffer from poor cleanability. Various methods aimed at solution of these problems have been proposed in Japanese Patent Application Disclosures SHO 61(1986)-255,354, SHO 53(1978)-17,736, SHO 63(1988)-17,460, SHO 61(1986)-167,956, etc. These methods are impracticable because they bring about no fully satisfactory effects and lead to increases of cost.

For the solution of problems of this sort, methods for the production of an electrophotographic toner possessing a desired particle diameter have been disclosed which generally comprise emulsifying, dispersing, and polymerizing a polymeric monomer, a coloring agent, and/or a magnetic powder, and a polymerization initiator in the presence of an emulsifier thereby preparing a main resin component, solidifying the resultant polymerization solution at a temperature not exceeding the glass transition point of the main resin component, heating the particles resulting from the solidification at a temperature exceeding the glass transition point of the main resin component thereby effecting thorough dissolution of the particles, and classifying the resultant solid particles (Japanese Patent Application Disclosures SHO 61(1986)-167,955, SHO 61(1986)-167,956, SHO 61(1986)-167,957, and SHO 61(1986)-72,258).

In these methods, however, since the polymerization is carried out mainly in the form of emulsion polymerization, the produced polymer particles acquire a particle diameter on the order of submicrons and the coloring agent such as carbon black is not included in the polymer particles but is left standing outside the polymer particles. Even if these microfine polymer particles are occluded in larger particles in the subsequent step of solidification or thermal fusion, they cannot be uniformly dispersed therein. As a result, the produced toner suffers from lack of uniform dispersion of the coloring agent and, when used as an electrophotographic toner, entails lack of uniform electric charging or causes a draft of toner, possibly followed by the phenomenon of fogging or the defilement of the drum surface. The polymer particles obtained by polymerization in these method are so small that their particle diameters are required to be controlled as well as increased by having the polymer particles subjected to solidification in the step of solidification at a temperature not exceeding the glass transition point of the resin. The solidification necessitates use of an inorganic acid or an organic acid as a solidifying agent. This solidifying agent cannot be thoroughly removed from the toner no matter how thoroughly the toner may be washed. The residual solidifying agent has the problem of rendering the toner resistant to dependency on the environment and compelling a decline in the electric property of the toner.

SUMMARY OF THE INVENTION

An object of this invention, therefore, is to provide a novel method for the production of microfine colored particles and an electrophotographic toner using the microfine colored particles obtained by this method. A further object of this invention is to provide a method for the production of microfine colored particles each having a coloring agent uniformly dispersed therein and, at the same time, enjoying a modified particle surface. Another object of this invention is to provide a method for the production of microfine colored particles promising to find utility as a coloring agent for toners, coating materials, inks, molded articles of resin, etc. Still another object of this invention is to provide an electrophotographic toner which, when used as a toner for such a printer device as a laser printer or a liquid crystal printer, produces clear images. A further object of this invention is to provide a novel method for the recovery from a suspension of microfine globular particles formed mainly of resin. Yet another object of this invention is to provide a method for efficient recovery form a suspension of microfine globular particles obtained as by the suspension polymerization technique, for example.

The present inventors have continued a diligent study with a view to overcoming the adverse state of affairs mentioned above, to find that microfine colored particles obtained by treating microfine globular colored particles resulting from suspension polymerization through a specific sequence of steps are perfectly free from all of the problems mentioned above and useful advantageously as a coloring agent for coating materials, inks, and molded articles of resin, let alone electrophotographic toners and that an electrophotographic toner using the microfine colored particles, when used in a printing device such as a laser printer or a liquid crystal printer, produces very clear images positively free from the problems inherent in the prior art mentioned above. The present invention has been perfected as a result.

The various objects described above are accomplished by a method for the production of microfine colored particles characterized by suspending a polymeric monomer in a suspension medium in the presence of a coloring agent and/or a magnetic powder, subjecting the resultant suspension to suspension polymerization, heat treating the resultant microfine globular colored particles having an average particle diameter in the range of from 3 to 50 $\mu$m with water as a heating medium at a temperature in the range of from 50 to 130° C. thereby converting the particles through fusion into blocks of particles, and disintegrating the blocks into particles of an average particle diameter substantially equal to that of the microfine globular colored particles existing prior to the fusion. In the method for the production of microfine colored particles according with the present invention, the heat treatment mentioned above can be carried out in the state in which the microfine globular colored particles resulting from suspension polymerization are present in the suspension medium which is water. Alternatively, this heat treatment may be performed on a cake of the microfine globular colored particles withdrawn from the suspension medium.

In one preferred embodiment of this invention, the method for production of microfine colored particles comprises suspending a polymeric monomer in a suspension medium in the presence of a coloring agent and/or a magnetic powder, subjecting the resultant suspension to suspension polymerization, heat treating the suspension of microfine globular colored particles having an average particle diameter in the range of from 3 to 50 $\mu$m at a temperature in the range of from 50 to 98° C. thereby effecting aging polymerization and, at the same time, converting the particles through fusion into blocks of particles, and disintegrating the blocks into particles having an average particle diameter substantially equal to that of the microfine globular colored particles existent prior to the fusion.

In further preferred embodiment of this invention, the method for production of microfine colored particles comprises suspending a polymeric monomer in a suspension medium in the presence of a coloring agent and/or a magnetic powder, polymerizing the resultant suspension and, after the conversion of the microfine globular colored particles having an average particle diameter in the range of from 3 to 50 $\mu$m has passed 90%, (1) adding water-insoluble microfine particles to the suspension, (2) heat treating the resultant mixture at a temperature in the range of from 50 to 98° C., thereby effecting aging polymerization and, at the same time, converting the microfine globular colored particles through fusion into blocks of particles, and then disintegrating the blocks of particles into particles having an average particle diameter substantially equal to that of the microfine globular colored particles existent prior to the fusion.

In yet another embodiment of the present invention, the method for production of microfine colored particles comprises suspending a polymeric monomer in a suspension medium in the presence of a coloring agent and/or a magnetic powder, polymerizing the resultant suspension, separating from the suspension the resultant microfine globular colored particles having an average particle diameter in the range of from 3 to 50 $\mu$m, subjecting the cake consequently obtained to a heat treatment under the conditions of 50 to 130° C. in temperature and 70 to 100% in relative humidity thereby converting the particles through fusion into blocks of particles, and disintegrating the blocks of particles into particles having an average particle diameter substantially equal to that of the microfine globular colored particles existent prior to the fusion.

In a preferred embodiment of the present invention, the microfine colored particles are produced by suspending a polymeric monomer in a suspension medium in the presence of a coloring agent and/or a magnetic powder, polymerizing the resultant suspension, separating from the suspension the resultant microfine globular colored particles having an average particle diameter in the range of from 3 to 50 μm, subjecting the cake consequently obtained to a heat treatment with hot water at 50 to 130° C. thereby converting the particles through fusion into blocks of particles, and then disintegrating the blocks into particles having an average particle diameter substantially equal to that of the microfine globular colored particles existent prior to the fusion.

The present invention is further directed to an electrophotographic toner of which particles each contain the microfine colored particle obtained by the method of production described above.

This invention is also directed to a method for the recovery of microfine suspended particles from a suspension medium, characterized by suspending a polymeric monomer in a suspension medium, subjecting the resultant suspension to suspension polymerization, adding microfine water-insoluble particles to the suspension of resultant microfine globular particles, causing agglomeration of the microfine globular particles, and separating the microfine globular particles in the form of agglomerated lumps by filtration from the suspension medium.

By the method of production according with the present invention, there can be produced microfine colored particles each of which enjoys uniformity of particle size, possesses a jogging particle surface, exhibits a marked decrease in the residual content of the surfactant and the dispersant remaining after use in the suspension polymerization, and has substantial freedom from variations of physical properties accompanied by a change in humidity. The microfine colored particles of the present invention, therefore, are usable advantageously as an electrophotographic toner capable of forming clear images and excellent in flowability and cleanability and also usable as a coloring agent or a modifying agent for coating materials, inks, and molded articles of resin. Particularly the electrophotographic toner of this invention which is produced by using the microfine colored particles described above is capable of forming images excellent in quality and free from the phenomenon of fogging at all times under environments of all sorts and, therefore, is usable in a wide variety of electrophotographic devices. Further, the method of the present invention for recovery of microfine globular particles from a suspension medium realizes an facilitates the solid-liquid separation by the use of an ordinary filtering device even when the microfine globular particles obtained by suspension polymerization happen to have a small particle diameter. This method, therefore, contributes to enhancing the productivity of the aforementioned method in the production of the microfine colored particles of the nature described above.

DETAILED DESCRIPTION OF THE INVENTION

Figure 1:
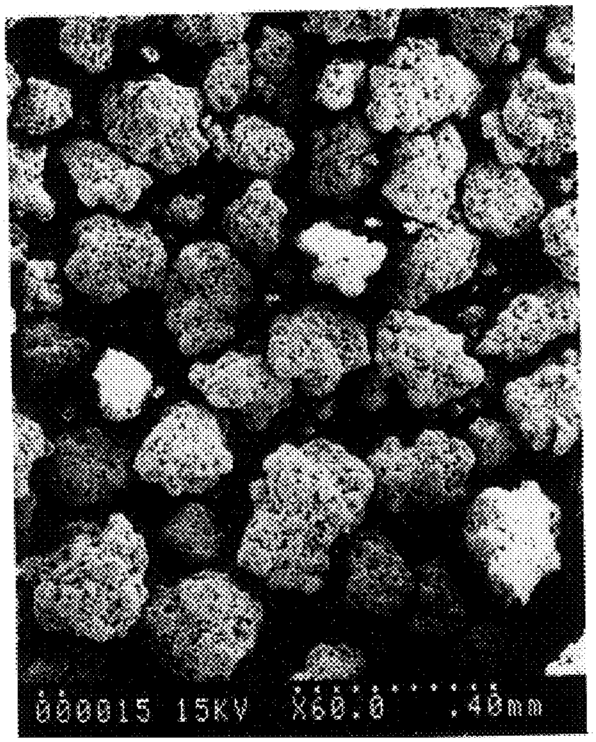
FIG. 1 is an electron micrograph of blocks of particles obtained in the step of heat treatment in the method of this invention.

Now, the present invention will be described in detail below with reference to embodiments thereof.

In the method of the present invention for the production of microfine colored particles, first a polymeric monomer is suspended in a suspension medium in the presence of a coloring agent and/or a magnetic powder and polymerizing the resultant suspension. The microfine globular colored particles obtained by the suspension polymerization have an average particle diameter in the range of from 3 to 50 μm, preferably 3.5 to 20 μm. This range of the average particle diameter has an extremely important significance from the standpoint of producing the microfine colored particles of this invention through the step of heat treatment and the step of disintegration which will be described specifically hereinbelow. The polymer particles which are obtained by a polymerization technique other than the suspension polymerization such as, for example, the emulsion polymerization technique generally have an average particle diameter approximately in the neighborhood of 0.1 μm. Microfine colored particles which are produced by heat treating these smaller polymer particles with water as a heating medium and disintegrating the resultant solid particles are conspicuously different in shape of particle and particle diameter distribution from the microfine colored particles obtained by the method of production according with the present invention. When the smaller microfine colored particles are used as a toner, it cannot produce images of fully satisfactory quality.

This suspension polymerization is desired to be performed after regulation of particle diameter or to be continued simultaneously with regulation of particle diameter. Preferably, it is performed after regulation of particle diameter. The regulation of the particle diameter is executed, for example, by dispersing prescribed components in an aqueous medium and passing the resultant suspension at least once through a line mixer such as T. K. Homomixer (manufactured by Tokushu Kika Kogyo K.K.) or Ebara Milder (manufactured by Ebara Mfg. Co., Ltd.).

The reaction of suspension polymerization is generally carried out at a temperature in the range of from 40 to 130° C. preferably from 50 to 90° C., for a period in the range of from 0.5 to 30 hours, preferably from 2 to 10 hours.

The polymeric monomers which are effectively usable as a polymeric monomer component for the suspension polymerization include styrene type monomers such as styrene, o-methyl styrene, m-methyl styrene, p-methyl styrene, alpha-methyl styrene, p-methoxy styrene, p-tert-butyl styrene, p-phenyl styrene, o-chlorostyrene, m-chlorostyrene, and p-chlorostyrene; acrylic acid or methacrylic acid type monomers such as methyl acrylate, ethyl acrylate, n-butyl acrylate, isobutyl acrylate, dodecyl acrylate, stearyl acrylate, 2-ethylhexyl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate; and ethylene, propylene, butylene, vinyl chloride, vinyl acetate, and acrylonitrile, for example. These polymeric monomers may be used either singly or in the form of a mixture of two or more members.

By suspension polymerizing the polymeric monomer described above and then heat treating the resultant microfine globular colored particles under the conditions to be described hereinbelow, the operational efficiency of the disintegration is improved. The operational efficiency of the disintegration is inferior when the fusion of particles proceeds excessively during the heat treatment. No sufficient effect of the treatment of particle surface is obtained when the fusion is insufficient. A cross-linking agent may be used during the suspension polymerization for the purpose of avoiding excessive fusion.

The cross-linking agents which are effectively usable herein include aromatic divinyl compounds such as divinyl benzene, divinyl naphthalene, and derivatives thereof; diethylenically unsaturated carboxylic esters such as ethylene glycol dimethacrylate, diethylene glycol dimethacrylate, triethylene glycol dimethacrylate, trimethylol propane triacrylate, allyl methacrylate, t-butylaminoethyl methacrylate, tetraethylene glycol dimethacrylate, and 1,3-butane diol dimethacrylate; all divinyl compounds such as N,N-divinyl aniline, divinyl ether, divinyl sulfide, and divinyl sulfonic acid; and compounds possessing at least three vinyl groups, for example.

Polybutadiene, polyisoprnee, unsaturated polyesters, and polyolefin chlorosulfonite are also effectively usable.

The coloring agent to be used for the production of microfine globular colored particles may be any of the dyes and pigments known to the art without reference to discrimination between organic and inorganic substances. The coloring agents which are effectively usable herein include carbon black, nigrosine dyes, aniline blue, calco-oil blue, chrome yellow, ultramarine blue, DuPont oil red, quinoline yellow, methylene blue chloride, phthalocyanine blue, malachite green oxalate, lamp black, oil black, azo oil black, and rose bengal, for example. Two or more of these coloring agents, when necessary, may be jointly used.

The magnetic powder is made of a substance which possesses a magnetic property and may be colored. Where such magnetic powders are colored they may be used alone, as coloring agents, or in conjunction with coloring agents. The magnetic powders which are effectively usable herein include powders of ferromagnetic metals such as iron, cobalt, and nickel and powders of metallic compounds such as magnetite, hematite, and ferrite, for example. These magnetic powders may be used as coloring agents either independently or in combination with the coloring agent mentioned above.

The coloring agent and/or the magnetic powder may be used in its unmodified form. When the coloring agent and/or the magnetic powder which has been given a surface treatment by a suitable method is used, the microfine colored particles to be produced have the coloring agent and/or the magnetic powder dispersed uniformly therein. This microfine colored particles are desirable because they produce images of high quality when they are used as a toner, for example. When carbon black is used as the coloring agent, for example, the carbon black graft polymer disclosed in Japanese Patent Unexamined Publications SHO 63(1988)-270,767 and SHO 63(1988)-265,913 proves to be ideal. When a coloring agent other than carbon black is used, the surface-treated coloring agent produced by the method disclosed in Japanese Patent Unexamined Publication HEI 1(1989)-118,573 proves to be ideal. These are associated herein by reference.

Though the amount of the coloring agent and/or the magnetic powder to be incorporated in the microfine colored particles may be varied in a wide range to suit the kind of the coloring agent and/or the magnetic powder to be used or the purpose for which the produced microfine colored particles are used, it is generally desired to be in the range of from 1 to 200 parts by weight, preferably from 1 to 100 parts by weight, based on 100 parts by weight of the polymeric monomer.

For the production of the microfine globular colored particles by the use of the coloring agent and/or the magnetic powder, the method which comprises preparing a polymeric monomer having the coloring agent and/or the magnetic powder dissolved or dispersed therein and suspension polymerizing the polymeric monomer is generally adopted conveniently. At times, this production may be effected by the method which comprises preparing globular polymer particles by polymerization performed in the absence of the coloring agent and/or the magnetic powder and then causing the globular polymer particles to absorb the coloring agent and/or the magnetic powder by the use of a suitable solvent.

The stabilizers which are effectively usable in the suspension polymerization include water-soluble macromolecules such as polyvinyl alcohol, starch, methyl cellulose, carboxymethyl cellulose, hdroxyethyl cellulose, sodium polyacrylate, and sodium polymethacrylate; surfactants such as anionic surfactants, cationic surfactants, amphoteric ionic surfactants, ad nonionic surfactants; and barium sulfate, calcium sulfate, barium carbonate, magnesium carbonate, calcium phosphate, talc, clay, diatomaceous earth, and powdered metal oxides, for example.

The anionic surfactants which are effectively usable herein include fatty acid salts such as sodium oleate and castor oil potash, alkyl sulfuric ester salts such as sodium lauryl sulfate and ammonium lauryl sulfate, alkylbenzene sulfonates such as sodium dodecylbenzene sulfonate, alkyl naphthalene sulfonates, alkane sulfonates, dialkyl sulfosuccinates, alkyl phosphoric ester salts, naphthalene sulfonic acid-formalin condensate, polyoxyethylene alkylphenyl ether sulfuric ester salts, and polyoxyethylene alkyl sulfuric ester salts, for example.

The nonionic surfactants which are effectively usable herein include polyoxyethylene alkyl ethers, polyoxyethylene alkylphenyl ethers, polyoxyethylene fatty acid esters, sorbitan fatty acid esters, polyoxy sorbitan fatty acid esters, polyoxyethylene alkyl amines, glycerin fatty acid esters, and oxyethylene-oxypropylene block polymers, for example.

The cationic surfactants which are effectively usable herein include alkyl amine salts such as lauryl amine acetate and stearyl amine acetate and quaternary ammonium salts such as lauryl trimethyl ammonium chloride, for example.

The amphoteric ionic surfactants usable effectively herein are represented by lauryl dimethyl amine oxide.

The stabilizer ought to be used with the composition and the amount of use thereof properly adjusted so that the produced microfine globular colored particles may assume particle diameters in the range of from 3 to 50 $\mu$m, preferably from 3.5 to 20 $\mu$m. When a water-soluble macromolecule is used as the stabilizer, for example, the amount of this stabilizer is desirably in the range of from 0.01 to 20% by weight, preferably 0.1 to 10% by weight, based on the amount of the polymeric monomer component. When a surfactant is adopted as the stabilizer, the amount of the stabilizer to be used is in the range of from 0.01 to 10% by weight, preferably 0.1 to 5% by weight, based on the amount of the polymeric monomer component.

As the polymerization initiator for use in the polymerization, any of the oil-soluble peroxide type and azo type initiators which are generally used for suspension polymerization can be adopted. The polymerization initiators which are effectively usable herein include peroxide type initiators such as benzoyl peroxide, lauroyl peroxide, octanoyl peroxide, benzoyl orthochloroperoxide, benzoyl orthomethoxyperoxide, methylethyl ketone peroxide, diisopropyl peroxy dicarbonate, cumene hydroperoxide, cyclohexanone peroxide, t-butyl hydroperoxide, and diisopropyl benzene hydroperoxide, and 2,2'-azo-bis-isobutylonitrile, 2,2'-azo-bis-(2,4-dimethyl valeronitrile), 2,2'-azo-bis-2,3-dimethyl butylonitrile, 2,2'-azo-bis-(2-methyl butylonitrile), 2,2'-azo-bis-2,3,3-trimethyl butylonitrile, 2,2'-azo-bis-2-isopropyl butylonitrile, 1,1'-azo-bis-(cyclohexane-1-carbonitrile), 2,2'-azo-bis-(4-methoxy-2,4-dimethyl valeronitrile), 2-(carbamoyl-azo) isobutylonitrile, 4,4'-azo-bis-4-cyanovaleic acid, and dimethyl-2,2'-azo-bis-isobutylate, for example. The polymerization initiator is desirably used in an amount in the range of from 0.01 to 20% by weight, preferably from 0.1 to 10% by weight, based on the amount of the polymeric monomer.

In the production of the microfine globular colored particles by the suspension polymerization of the polymeric monomer component described above, the monomer component may incorporate therein other polymer such as, for example, a polyester and further incorporate therein a suitable amount of a known additive such as a chain transfer agent for the purpose of adjustment of polymerization degree. When the microfine colored particles of this invention are intended for use in an electrophotographic toner, it can be produced in a state occluding therein wax and a charge controlling agent by having these additives incorporated in advance in the polymeric monomer during the production. The microfine globular colored particles thus produced are desired to be such that the average particle diameter is in the range of from 3 to 50 $\mu$m, preferably from 3.5 to 20 $\mu$m and the particle diameter distribution expressed by the coefficient of variation of particle diameters is in the range of from 0 to 80%, preferably 1 to 50%. The expression "coefficient of variation of particle diameter" as used herein means the percentage of the quotient of the standard deviation divided by the average particle diameter.

In the method of production according with the present invention, the microfine globular colored particles obtained by suspension polymerization and having an average particle diameter in the range of from 3 to 50 $\mu$m are converted into fusion blocks of particles by heat treating with water as a heating medium at a temperature in the range of from 50 to 130° C.

This heat treatment can be carried out in the state in which the microfine globular colored particles resulting from the suspension polymerization are present in water as a suspension medium. Otherwise, the heat treatment may be carried out on a cake of microfine globular colored particles which is removed from the suspension medium. A plurality of these treatments may be performed in a combined state. As concrete means for executing the heat treatment of the cake of microfine globular colored particles removed from the suspension medium, a method which comprises placing the case on a suitable retaining member and pouring hot water of a temperature exceeding the aforementioned prescribed temperature in the form of shower onto the cake and a method which comprises retaining the cake at a prescribed temperature under a prescribed high humidity may be conceived, for example. This heat treatment may be alternatively carried out under normal pressure, a reduced pressure, or an increased pressure.

This heat treatment is an extremely important and indispensable step for the modification of the surface of the microfine globular colored particles. If the temperature of the hot water used in this case is lower than 50° C., the fusion of the microfine globular colored particles does not occur at all or it occurs only insufficiently, with the result that a conspicuous effect of surface modification will not be manifested. Conversely, if this temperature exceeds 130° C., the fusion of microfine globular colored particles proceeds excessively to an extent such that the subsequent step of disintegration is carried out only with difficulty and the produced microfine colored particles have a very wide particle diameter distribution.

Particularly in the first mode in which the heat treatment is carried out by heating the suspension of the microfine globular colored particles, the temperature at which the suspension is heated is desired to be in the range of from 50° C. to 98° C., preferably from 60° C. to 95° C. If this temperature exceeds 98° C., the fusion proceeds unduly quickly and defies control in terms of time. If it exceeds 100° C., the fusion is required to be carried out under an increased pressure.

Further in this first mode of heat treatment, the conversion of the microfine globular colored particles in the suspension polymerization solution is desired to be not less than 90% during the thermal fusion of the microfine globular colored particles. The method of the present invention could be executed if the conversion was 100%. Since the time required for the production of the suspended polymer solution increases and the temperature required for the heat treatment rises in accordance as the conversion increases, the heat treatment cannot be effectively carried out under normal pressure and must be performed under an increased pressure attainable by the use of an autoclave, for example. The method, therefore, is desired to be such as to allow survival of the unaltered monomer to some extent. From the commercial point of view, therefore, the conversion is desired to be in the range of from 90 to 99.9%, preferably from 95 to 99.9%. If the conversion is less than 90%, since the unaltered monomer plasticizes the microfine globular colored particles and the heating induces fusion of these particles accompanied by complete loss of boundary surface, the subsequent disintegration encounters difficulty in giving the produced particles the same average particle diameter as that of the microfine globular colored particles existent prior to the fusion. A mass of blocks of particles is obtained by heat treating the microfine globular color particles in the suspension solution thereby effecting aging polymerization and further polymerization of the unaltered monomer and consequently inducing fusion of the microfine globular colored particles.

In the second mode in which the heat treatment is performed on the cake of microfine colored particles separated from the suspension solution under high humidity, the temperature of the high-humidity gas to be used for the heat treatment is desired to be in the range of from 70° C. to 100° C. and the relative humidity of the atmosphere enveloping the site of the heat treatment is desired to be in the range of from 70 to 100%, preferably from 80 to 100%. If the relative humidity is less than 70%, since the water in the cake is vaporized, the fusion proceeds ununiformly or it does not proceed as quickly as required. The high-humidity heat treatment performed as described above induces aging polymerization and further polymerization of the unaltered monomer and, at the same time, effects fusion of the microfine globular colored particles, to give rise to the mass of blocks of particles. This high-humidity heat treatment is generally carried out for a period in the range of from 2 to 90 minutes, preferably from 5 to 60 minutes.

In the third mode in which the heat treatment is executed by pouring hot water on the cake of microfine colored particles separated from the suspension solution, the hot water to be used for this heat treatment is desired to have a temperature in the range of from 70° C. to 100° C. The hot water heat treatment performed as described above induces aging polymerization and further polymerization of the unaltered monomer and, at the same time, effects fusion of the microfine globular colored particles to give rise to the mass of blocks of particles. The hot water heat treatment is generally carried out for a period in the range of from 2 to 90 minutes, preferably from 5 to 60 minutes. The hot water heat treatment may be carried out in a solid-liquid separating device such as, for example, a filter or a centrifuge which has been used in the withdrawal of the microfine globular colored particles from the suspension solution. In this case, the particles under treatment may be simultaneously washed with hot water without obstructing the treatment.

The microfine globular colored particles are mutually fused by the heat treatment performed as described above. The state of this fusion may be arbitrarily controlled by regulating the effect of treatment as desired. In order for the subsequent step of disintegration to form microfine colored particles having a uniform particle diameter distribution and possessing properties excellent for an electrophotographic toner, the ideal state of fusion is such that the boundary surface of the particles does not wholly disappear but remains at least partially. Further, in the first mode in which the heat treatment is effected by heating the suspension solution of the microfine globular colored particles, it is permissible to add a flocculating agent, when necessary, to the suspension solution prior to the heat treatment. This addition of the flocculating agent promotes cohesion or sedimentation of the microfine globular colored particles and facilitates the mutual fusion of these particles by the heat treatment. Likewise in the second and third modes in which the heat treatment is performed on the cake of microfine globular colored particles withdrawn from the suspension medium, it is beneficial for the withdrawal of the microfine globular colored particles from the suspension medium to add a flocculating agent to the suspension medium and induce cohesion or sedimentation of the microfine globular colored particles. This is because the microfine globular colored particles contemplated by this invention have an extremely small average particle diameter falling in the range of from 3 to 50 $\mu$m as described above and, therefore, the withdrawal of these particles in the unmodified form from the suspension solution is extremely difficult and the withdrawal, if carried out at all, necessitates consumption of a huge amount of energy or use of a special device. The cohesion or sedimentation of the microfine globular colored particles in the suspension solution proves to be desirable also from the standpoint of the ease with which the bulk density of the blocks of particles obtained by the fusion is controlled or the ease with which the cake resulting from the filtration is handled.

The flocculating agent which is used for this purpose may be selected from among the known flocculating agents, which include inorganic acids such as hydrochloric acid, organic acids such as oxalic acid, and water-soluble metal salts formed between these acids and alkaline earth metals and aluminum, for example. The use of these known flocculating agents require due attention because they have the possibility of affecting the performance of the produced microfine colored particles when they are used as an electrophotographic toner. The present inventors have found that a bad solvent for the microfine globular colored particles can be used as a sedimenting agent during the isolation or fractionation of a macromolecular substance and further that the microfine colored particles produced by the use of this solvent are free from the drawbacks observed in the product using a flocculating agent. The bad solvents which are effectively usable for this purpose include hydrocarbons such as hexane, heptane, octane, and petroleum ether and lower alcohols such as methanol and ethanol, for example. The expression "bad solvent for the microfine globular colored particles" as used herein means a solvent which is incapable of dissolving or dispersing the resin forming the microfine globular colored particles. Of course, the bad solvent or sedimenting agent of the nature described above can be used in combination with the known flocculating agent unless the combined use causes an inconvenience.

The present inventors have also found that when microfine water-insoluble particles are added to the suspension solution of the microfine globular colored particles, the same stable flocculation is effected to form blocks of particles of a desirable size as when the known flucculating agent is used, the operation of fusion can be stably performed, and the produced microfine colored particles are free from the drawbacks observed in the product obtained when a flocculating agent is used. The microfine water-insoluble particles to be used in the present invention are intended to keep the cohesion or fusion of the microfine globular colored particles in the optimum condition, notably enhance the disintegrability of the blocks of particles in the subsequent step and, at the same time, enable the microfine colored particles resulting from the disintegration to manifest high physical properties. The particle diameter of the microfine water-insoluble particles, therefore, must be smaller than that of the microfine globular colored particles. To be specific, it is desired to be less than one half of the particle diameter of the microfine globular colored particles.

In a preferred embodiment of the present invention, therefore, the addition of such microfine water-insoluble particles to the suspension solution of the microfine globular colored particles is carried out prior to the step of thermal fusion of the microfine globular colored particles or the step of recovery of the microfine globular colored particles from the suspension solution.

In one of the most preferred embodiments of the present invention, for example, there is adopted a procedure which comprises suspending a polymeric monomer in a suspension medium in the presence of a coloring agent and/or a magnetic powder, polymerizing the resultant suspension and, after the conversion of the resultant microfine globular colored particles having an average particle diameter in the range of from 3 to 50 $\mu$m has increased beyond 90%, (1) adding microfine water-insoluble particles to the suspension solution and then (2) heat treating the resultant mixture at a temperature in the range of from 50° C. to 98° C. thereby effecting aging polymerization and, at the same time, inducing fusion of the microfine globular colored particles and consequent conversion thereof into blocks of particles, and subsequently disintegrating the blocks of particles to an average particle diameter substantially equaling that of the microfine globular colored particles existent prior to the fusion.

Now, the microfine water-insoluble particles which are used as one kind of flocculating agent in the present invention will be described specifically below. Various kinds of organic powders and inorganic powders can be used as the microfine water-insoluble particles.

The organic powders which are effectively usable herein include cross-linked and non-cross-linked polymer powders, organic pigments, charge controlling agents, and waxes, for example. The cross-linked and non-cross-linked resin powders include styrene type resin powders, acrylic type resin powders, methacrylic type resin powders, polyethylene type resin powders, polypropylene type resin powders, silicone type resin powders, polyester type resin powders, polyurethane type resin powders, polyamide type resin powders, epoxy type resin powders, polyvinyl butyral type resin powders, rosin type resin powders, terpene type resin powders, phenol type resin powders, melamine type resin powders, and guanamine type resin powders, for example. The organic pigments which are effectively usable herein include yellow pigments such as navel yellow, naphthol yellow S, Hansa yellow 10G, benzidine yellow G, benzidine yellow GR, quinoline yellow lake, permanent yellow NCG, and tartrazine lake, orange pigments such as molybdenum organe, permanent organe RK, benzidine orange G, and indanthrene brilliant orange GK, red pigments such as permanent red 4R, resor red, pyrazolone, red 4R, watching red calcium salt, lake red D, brilliant carmine 6B, eosin lake, rhodamine lake B, azaline lake, and brilliant carmine B, purple pigments such as fast violet B and methyl violet lake, blue pigments such as alkali blue lake, victoria blue lake, phthalocyanine blue, nonmetallic phthalocyanine blue, partial chloride of phthalocyanine blue, fast sky blue, and indans blue BC, and green pigments such as pigment green B, malachite green lake, and fanal yellow green G, for example. The charge controlling agents which are effectively usable herein include powders of such substances as nigrosine, monoazo dyes, zinc, hexadecyl succinate, alkyl esters and alkyl amides of naphthoeic acid, nitrohumic acid, N,N-tetramethyl diamine benzophenone, N,N-tetramethyl benzidine, triazine, and metal complexes of salicyclic acid which are called electrification controlling agents in the field of electrophotography. The waxes which are effectively usable herein include powders of polymers having a ring softening point in the range of from 80° C. to 180° C., high-melting paraffin waxes having a melting point in the range of from 70° C. to 60° C., fatty acid esters and partially saponified derivatives thereof, higher fatty acids, metal salts of fatty acids, and higher alcohols, for example.

The inorganic powders which are effectively usable herein include microfine particles or granules of alumina, titanium dioxide, barium titanate, magnesium titanate, calcium titanate, strontium titanate, zinc oxide, silica sand, clay, mica, tabular spar, diatomaceous earth, various inorganic oxide pigments, chromium oxide, cerium oxide, iron red, antimony trioxide, magnesium oxide, zirconium oxide, barium sulfate, barium carbonate, calcium carbonate, silica, silicon carbide, silicon nitride, boron carbide, tungsten carbide, titanium carbide, and carbon black, for example.

Of the water-insoluble powders cited above, those which have a hydrophobicity index (Mw: methanol wettability) of at least 5 prove to be particularly desirable because of their ability to impart ideal moistureproofness to the microfine globular particles to be obtained in consequence of disintegration. They are also beneficial in terms of the stability of charging which is manifested when the microfine globular particles are used as an electrophotographic toner. The water-insoluble powders which are particularly desirable as described above include various inorganic oxides such as silica, titanium, and zirconia which have undergone a treatment for impartation of hydrophobicity and electroconductive species of carbon black such as Ketjen black, acetylene black, and furnace black, for example.

The term “hydrophobicity index” as used herein refers to the numerical value which is obtained by the following procedure.

(1) In a beaker having an inner volume of 200 ml, 0.2 g of a given sample is placed and diluted with 50 ml of purified water.

(2) The aqueous solution of the sample is kept stirred with a magnetic stirrer and methanol is added to the stirred solution under the surface.

(3) The point at which the visible sign of the sample ceases to exist on the surface of the stirred solution is taken as the end point of the test.

(4) The degree of hydrophobicity of the sample is calculated in accordance with the following formula using the amount of methanol consumed in the test.

$$\text{Hydrophobicity index } (\%)=\{x/(50+x)\}\times 100$$

wherein x stands for the amount of methanol used (ml).

In consideration of the charging stability of the toner of a small particle diameter necessary for realizing the production of images of high resolution, the microfine water-insoluble particles to be selected for use herein are desired to possess electroconductivity. The microfine electroconductive water-insoluble particles which are effectively usable herein include powders of electroconductive carbon black, titanium oxide and tin oxide doped with antimony oxide, electroconductive zinc oxide, and titanium black, for example.

To be used effectively for the purpose just mentioned, the microfine water-insoluble particles are desired to have particle diameters in the range of from 0.001 to 10 μm, preferably from 0.055 to 5 μm. If the microfine water-insoluble particles have particle diameters not exceeding 0.001 μm, there arises the possibility that the effect of the addition of these particles, i.e. the notable improvement in the property of flocculation, the disintegrability, the flowability, cleanability, etc. to be manifested by the particles when they are used as an electrophotographic toner, will be no longer manifested. Conversely, if the microfine water-insoluble particles have particle diameters exceeding 10 μm, there ensues the possibility that the effect of the addition of these particles will be unduly low and the improvement in resolution of images to be attained when the particles are used as an electrophotographic toner will not be manifested. The amount of these microfine water-insoluble particles to be added may be selected in a wide range, depending on the kind and particle diameter of the microfine water-insoluble particles to be used. If this amount is unduly small, the effect of the addition of these particles is manifested only with difficulty. If the amount is unduly large, the possibility arises that the particles, when used as an electrophotographic toner, will exert adverse effects on charging property and environmental stability. The amount of addition, therefore, is desired to be in the range of from 0.01 to 100 parts by weight, preferably from 0.1 to 50 parts by weight, based on 100 parts by weight of the polymeric monomer component. The various species of microfine water-insoluble particles cited above may be used either singly or jointly in the form of a mixture of two or more members. It goes without saying that even when the microfine water-insoluble particles are used, the known flocculating agent or the bad solvent for microfine globular colored particles which is mentioned above may be simultaneously used unless the combined use brings about an inconvenience. Optionally, a proper organic solvent may be additionally used for the purpose of promoting the fusion.

The cohesion or sedimentation of the microfine globular colored particles caused by the addition of the microfine water-insoluble particles of the kind described above to an aqueous suspension solution is initiated by making this addition to the suspension solution of the microfine globular particles and allowing the resultant mixture to stand for a prescribed period optionally in a stirred state without specifically requiring application of heat. In the method for production of the microfine colored particles of the present invention, application of heat within a prescribed range presents no problem of any sort because the microfine globular colored particles resulting from the suspension polymerization are brought into a mutually fused state, specifically the state in which these particles are mutually fused without complete loss of their boundary surface. To be specific, when the heat treatment for the fusion of microfine globular colored particles is carried out by heating the suspension of the microfine globular colored particles as in the first mode described above, the cohesion to fusion of the microfine globular colored particles can be continuously brought about by performing the application of heat at a temperature in the range of from 50° C. to 130° C. subsequent to the addition of the microfine water-insoluble particles. When the heat treatment for fusion of microfine globular colored particles is carried out on the cake of microfine globular colored particles withdrawn from the suspension medium as in the second or third mode described above, the state of fusion can be produced to some extent in the aggregate withdrawn in the form of a cake from the suspension solution by performing the application of heat at or below a temperature in the range of from 50° C. to 130° C. for a brief period during the treatment of cohesion.

In the case of the first mode described above in which the heat treatment for the fusion for the microfine globular colored particles is effected by heating the suspension solution of the microfine globular colored particles, the blocks of particles resulting from the fusion of the microfine globular colored particles are obtained from the suspension solution by the use of an ordinary solid-liquid separating device utilizing the principle of suction filtration, pressure filtration, or centrifugal filtration. The state of fusion to be produced in the blocks of particles is desired to be such that the product of the fusion acquires a bulk density in the range of from 0.1 to 0.9 g/cm$^3$, preferably from 0.2 to 0.7 g/cm$^3$. Though the blocks of particles are not limited in shape or size, they are desired to give rise to particles having an average size in the range of from 20 to 10,000 μm, preferably from 30 to 1,000 μm, in consideration of the conveniences of the operations of filtration, drying, and disintegration which follow the treatment for thermal fusion. If the size is less than 20 μm, the withdrawal of particles entails consumption of a very large volume of energy or necessitates use of a special device. If this size exceeds 10,000 μm, the disintegration calls for a huge energy. The blocks of particles obtained as described above are then forwarded to the step of disintegration via the step of drying.

In the second and third modes described above in which the heat treatment for the sake of fusion of the microfine globular colored particles is performed on the cake of microfine globular colored particles withdrawn from the suspension medium, the microfine globular colored particles are desired to be converted by mutual cohesion into an aggregate of microfine particles in preparation for the solid-liquid separation of the microfine globular colored particles from the suspension medium so as to facilitate this separation by the use of an ordinary solid-liquid separating device. The aggregate of microfine particles is desired to have a bulk density in the range of from 0.05 to 0.9 g/cm$^3$, preferably from 0.1 to 0.7 g/cm$^3$. Though the aggregate of microfine particles is not limited in shape and size, it is desired to be such as to give rise to particles of an average size in the range of from 20 to 10,000 μm, preferably from 30 to 1,000 μm, in consideration of the conveniences of the operation of solid-liquid separation and the operations of drying and disintegration following the heat treatment. In these modes, the heat treatment described above is performed on the cake of microfine globular colored particles withdrawn as described above and, as a result, the blocks of particles resulting from fusion of the microfine globular colored particles are obtained. The state of fusion to be obtained is desired to be such that the blocks of particles acquire a bulk density in the range of from 0.1 to 0.9 g/cm$^3$, preferably 0.2 to 0.7 g/cm$^3$. The blocks of particles are then forwarded, in much the same manner as in the first mode described above, to the step of disintegration through the step of drying.

At the step of disintegration, the blocks of particles in a dry state are disintegrated to an average particle diameter substantially equal to that of the microfine globular colored particles existent prior to the fusion. The disintegration can be attained by the use of any of pulverizing devices heretofore employed for commercial production of particles and granules, for example.

Figure 2:
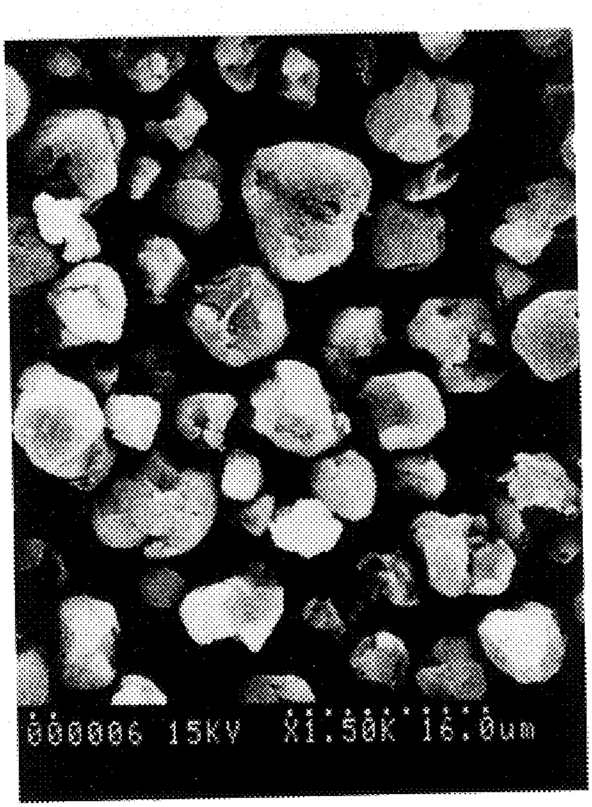
FIG. 2 is an electron micrograph of microfine colored particles obtained by the method of this invention.

In an ideal mode, the disintegration to an average particle diameter substantially equal to that of the microfine globular colored particles existent prior to the fusion as referred to herein resides in causing the individual particles of the blocks of particles resulting from the fusion of microfine globular colored particles performed to an extent short of inducing complete loss of the boundary surface thereof as clearly shown in a scanning electron micrograph (60 magnifications) of FIG. 1 to be disintegrated into microfine globular colored particles existent prior to the fusion as units and consequently reverting the individual particles of the blocks to the state in which the microfine globular colored particles existent prior to the disintegration have been merely deformed. It is actually difficult, however, to control uniformly the state of fusion of the boundary surface. As shown clearly in a scanning electron micrograph (1,500 magnifications) of FIG. 2, the microfine colored particles to be produced are generally obtained in the form of a mixture of microfine particles which is produced when the microfine globular colored particles prior to the fusion and disintegration are deformed and, at the same time, partly chipped and the resultant chippings are caused to adhere to the deformed particles. Even when a set of the microfine colored particles is a mixture of this description, it is by no means inferior in quality to the microfine colored particles in the ideal form so long as the average particle diameter of the microfine globular colored particles of this mixture is substantial equal to that of the microfine globular colored particles prior to the fusion and disintegration. In this case, when the average particle diameter of the microfine colored particles has a rate of change generally within 20%, desirably within 10%, and more desirably within 5%, of the average particle diameter of the microfine globular colored particles, the average particle diameter of the microfine colored particles and that of the microfine globular colored particles may well be regarded as substantially identical.

The microfine colored particles produced as described above are such that the particle diameter and the particle diameter distribution thereof have been controlled as desired. Ideally, however, the particle diameter is in the range of from 3 to 50 μm, preferably from 3.5 to 20 μm, and the average particle diameter distribution is such that the coefficient of variation of particle diameter is in the range of from 0 to 80%, preferably 0 to 50%. The term "coefficient of variation of particle diameter" as used herein means the percentage of the quotient of the standard deviation divided by the average particle diameter. Although the microfine colored particles are not specifically limited in shape, they may be either particles which are spheres macroscopically and yet have a finely jogging surface or nonspheric particles.

The electrophotographic toner according with the present invention uses the microfine colored particles mentioned above. In order for this toner to possess a proper charging property, the average particle diameter is ideally in the range of from 3.5 to 20 μm, preferably from 4 to 15 μm. The microfine colored particles may be used in their unmodified forms as an electrophotographic toner.

Such additives as a charge controlling agent for the adjustment of charging and a fluidifying agent which are normally used in ordinary toners may be properly incorporated in the microfine colored particles of the present invention.

The method for effecting the incorporation of a charge controlling agent is not particularly restricted. Any of the known methods available for the purpose of this incorporation may be adopted. For example, a method which comprises having the charge controlling agent incorporated in the polymeric monomer in advance of the polymerization of the polymeric monomer having a coloring agent dispersed therein and a method which comprises causing the charge controlling agent to be deposited fast on the surface of the microfine colored particles by aftertreating the microfine colored particles with the charge controlling agent may be properly adopted.

In several preferred embodiments of the present invention, the cohesion or sedimentation of the microfine globular colored particles in the process of production is promoted and the solid-liquid separation of the microfine globular colored particles from the suspension medium is facilitated by adding microfine water-insoluble particles of the kind described above to the suspension of the microfine globular colored particles. This technical idea need not be limited to the method for the production of the microfine colored particles contemplated by this invention but may be extensively applied to the method for recovery of the microfine globular particles produced by suspension polymerization from the suspension medium and to the method for recovery of microfine particles by solid-liquid separation from a varying dispersion system having fine particles mainly of resin dispersed in an aqueous suspension solution such as, for example, a suspension obtained by heating and melting a resin component in an aqueous dispersion medium.

This is because the cohesion or sedimentation which is induced after the addition of the microfine water-insoluble particles without application of heat at a particularly high temperature causes the microfine globular particles in the resultant blocks of particles to be fused by point contact or slight surface contact across their boundary surface and, as a result, the microfine particles which are obtained by separating the blocks of particles from the suspension solution by the use of an ordinary solid-liquid separating device mentioned above and drying and disintegrating the separated blocks of particles substantially retain the globular shape of the microfine particles obtained by suspension polymerization and show no sign of any deterioration of quality like the microfine particles produced by using a known flocculating agent. It is further because the disintegration which is effected by the use of a pulverizing device of relatively simple mechanism and small energy consumption is capable of converting the blocks of particles into particles of an average particle diameter substantially equaling the average particle diameter of the microfine globular particles existent prior to the cohesion. Of course, the treatment which follows the solid-liquid separation may be performed by any desired method. For example, the heat treatment to be performed for the purpose of modifying the surface property of microfine particles in the process of production of the microfine globular colored particles mentioned above may be adopted. The technique of recovery of microfine particles from the suspension solution by the use of the aforementioned microfine water-insoluble particles as a flocculating agent is believed to be particularly useful for the production of microfine globular particles having an average particle diameter in the range of from 1 to 100 μm, especially from 1 to 50 μm, and rendering difficult the separation thereof by the ordinary method of centrifugal sedimentation or for the production of microfine globular particles for use in an electrophotographic toner for which the deterioration of moistureproofness by the use of a known flocculating agent presents a particularly serious problem.

In the recovery method of present invention, it is not necessary to heat the suspension after the addition of the microfine water-insoluble particles in order to induce the cohesion or sedimentation of the microfine particles in the suspension solution. Considering the operations efficiency, however, a heat treatment to a temperature exceeding the Tg of the polymer forming said microfine globular particles may be permissible unless the heat treatment causes excessive fusion of the microfine globular particles.

EXAMPLE

Now, the present invention will be described in detail below with reference to working examples, which are cited purely for the illustration of this invention and are not meant to be limitative in any sense of this invention. Wherever the term "parts" is mentioned in the following working examples and controls, it shall be construed invariably as "parts by weight" unless otherwise specified.

Example 1

In a reaction kettle provided with a stirrer, an inert gas inlet tube, a reflux cooling tube, and a thermometer, 2,000 parts of deionized water having 1 part of polyvinyl alcohol dissolved therein was placed. In this water, a mixture prepared in advance by dissolving 80 parts of benzoyl peroxide in a polymeric monomer consisting of 585 parts by styrene, 390 parts of butyl methacrylate, and 25 parts of glycidyl methacrylate was stirred at a high speed to form a homogeneous suspension. Then, the suspension was exposed to the blow of nitrogen gas and, at the same time, heated to 80° C., stirred continuously at this temperature for five hours to undergo polymerization, and the deprived of water, to obtain a polymer having an epoxy group as a reactive group.

By the use of a pressure kneader, 400 parts of the polymer having the epoxy group as a reactive group, 150 parts of carbon black (produced by Mitsubishi Chemical Industry Co., Ltd. and marketed under trademark designation of "Carbon Black MA-100R"), and 50 parts of a charge controlling agent (produced by Hodogaya Chemical Industry Co., Ltd. and marketed under trademark designation of "Aizen Spilon Black RH") were kneaded and caused to react under the conditions of 160° C. and 100 rpm. The resultant reaction mixture was cooled and pulverized, to produce a carbon black graft polymer as a coloring agent.

In the same reaction kettle that was used above, 8,970 parts of deionized water having dissolved therein 5 parts of sodium dodecylbenzenesulfonate was placed. In this water, a mixture prepared in advance by combining 500 parts of the aforementioned carbon black graft polymer as a coloring agent, 30 parts of azo-bis-isobutylonitrile, and 30 parts of 2,2'-azo-bis-(2,4-dimethylvaleronitrile) with a polymeric monomer component consisting of 800 parts of styrene, 200 parts of n-butyl acrylate, and 0.03 part of divinyl benzene was stirred by the use of a mixing device (produced by Tokushu Kika Kogyo K.K. and marketed under trademark designation of "T. K. Homomixer") at 8,000 rpm for five minutes, to form a homogeneous suspension.

Then, the suspension was exposed to the blow of nitrogen gas and heated to 65° C., stirred continuously at this temperature for five hours to undergo suspension polymerization, and further heated at 75° C. for one hour to afford a suspension (1) of microfine globular colored particles having a conversion of 95.0%, an average particle diameter of 5.82 μm, and a coefficient of variation of particle diameter of 20.5%. When the suspension (1) of the microfine globular colored particles kept at 75° C. and 2,095 parts of methanol added thereto were heated for one hour, blocks having the particles mutually fused were obtained. The blocks were separated by filtration and dried by the use of a hot air drier at 50° C. for 10 hours, to afford 1,500 parts of blocks having the individual particles fused in a state retaining their boundary surface thereof partially, possessing a bulk density of 0.20 g/cm$^3$, and assuming the appearance of a cake of millet seeds glued with thick malt jelly. These blocks were fed at a rate of 15 kg/hr to an ultrasonic jet granulating device (produced by Nippon Pneumatic Kogyo K.K. and marketed under product code of "IDS2 Type") and disintegrated therein, to afford microfine colored particles (1).

The microfine colored particles (1), by measurement with a Coulter Counter (aperture 100 μm), were found to have an average particle diameter of 5.67 μm and a coefficient of variation of particle diameter of 18.7%. The microfine colored particles (1) were used in their unmodified forms as an electrophotographic toner (1) to produce images with an electrostatic copier (produced by Ricoh Company, Ltd. and marketed under product code of "Type 4060"). The results are shown in Table 1.

EXAMPLE 2

In the same reaction kettle as used in Example 1, 8,970 parts of deionized water having dissolved therein 30 parts of polyvinyl alcohol (produced by Kuraray Company, Ltd. and marketed under product code of "PVA 205") was placed. In this water, a mixture prepared in advance by combining 50 parts of Brilliant Carmine 6B (produced by Noma Kagaku K.K.) as a coloring agent, 30 parts of azo-bis-isobutylonitrile, and 30 parts of 2,2'-azo-bis-(2,4-dimethyl valeronitrile with a polymeric monomer component consisting of 800 parts of styrene and 200 parts of n-butyl acrylate was stirred with a mixing device (produced by Tokushu Kiko Kogyo K.K. and marketed under trademark designation of "T. K. Homomixer") at 6,000 rpm for five minutes, to form a homogeneous suspension.

Then, the suspension was exposed to the blow of nitrogen gas and heated to 65° C. and stirred continuously at this temperature for five hours to undergo suspension polymerization and thereafter heated at 75° C. for one hour, to afford a suspension (2) of microfine globular colored particles having a conversion of 98.0%, an average particle diameter of 6.42 μm, and a coefficient of variation of particle diameter of 21.3%. When the suspension (2) of the microfine globular colored particles kept at 75° C. and 13 parts of an aqueous-paste charge controlling agent containing 35% of principal component (produced by Orient Kagaku Kogyo K.K. and marketed under trademark designation of "Bontron S-34") added thereto were heat treated at 95° C. for one hour, to afford blocks having the individual particles mutually fused. The blocks were separated by filtration and dried by the use of a reduced-pressure drier at 50° C. for eight hours, to give rise to 1,110 parts of blocks having the individual particles fused in a state retaining the boundary surface thereof partially, possessing a bulk density of 0.28 g/cm$^3$, and assuming the appearance of a cake of millet seeds glued with thick malt jelly. The blocks were fed at a rate of 12 kg/hr to an ultrasonic jet pulverizer (produced by Nippon Pneumatic Kogyo K.K. and marketed under product code of "IDS 2 Type") and disintegrated therein, to produce microfine colored particles (2).

The microfine colored particles (2), by measurement with a Coulter Counter (aperture 100 μm), were found to have an average particle diameter of 6.15 μm and a coefficient of variation of particle diameter of 23.0%. The microfine colored particles (2) were used in their unmodified form as an electrophotographic toner (2) to produce images with an electrostatic copier (produced by Ricoh Company, Ltd. and marketed under product code of "Type 4060"). The results are shown in Table 1.

EXAMPLE 3

A polymer-treated magnetic material was obtained by kneading 200 parts of the polymer possessing an epoxy group as a reactive group obtained by following the procedure of Example 1 and 400 parts of a powdery magnetic material (produced by Titan Kogyo K. K. and marketed under trademark designation of "Mapico BL-200") by the use of a pressure kneader under the conditions of 160° C. and 100 rpm, and then cooling and pulverizing the resultant blend.

In the same reaction kettle as used in Example 1, 8,970 parts of deionized water having dissolved therein 5 parts of sodium dodecylbenzenesulfonate as an anionic surfactant was placed. In this water, a mixture prepared in advance by combining 700 parts of the aforementioned polymer-treated magnetic material, 30 parts of azo-bis-isobutylonitrile, and 30 parts of 2,2'-azo-bis-(2,4-dimethyl varleronitrile) with a polymeric monomer component consisting of 800 parts of styrene, 200 parts of n-butyl acrylate, and 0.1 part of divinyl benzene was stirred by the use of a mixing device (produced by Tokushu Kika Kogyo K. K. and marketed under trademark designation of "T. K. Homomixer") at 8,000 rpm for five minutes, to form a homogeneous suspension.

Then, the suspension was exposed to the blow of nitrogen gas and heated to 65° C., stirred continuously at this temperature for five hours to undergo suspension polymerization, and heated further at 75° C. for one hour, to afford a suspension (3) of microfine globular colored particles having a conversion of 98.0%, an average particle diameter of 5.43 μm, and a coefficient of variation of particle diameter of 22.5%. The suspension (3) of the microfine globular colored particles kept at 75° C. and 41 parts of an aqueous-paste charge controlling agent containing 35% of a principal component (produced by Orient Kagaku Kogyo K. K. and marketed under trademark designation of "Bontron S-34") and 5 parts of aluminum chloride containing 5% of a principal component added thereto were heat treated at 95° C. for three minutes, to afford blocks having the individual particles mutually fused. These blocks were separated by filtration and dried by the use of a reduced-pressure drier at 50° C. for eight hours, to afford 1,700 parts of blocks having the individual particles fused in a state retaining the boundary surface thereof partially, possessing a bulk density of 0.22 g/cm$^3$, and assuming the appearance of a cake of millet seeds glued with thick malt jelly. These block were fed at a rate of 18 kg/hr to an ultrasonic jet pulverizer (produced by Nippon Pneumatic Kogyo K. K. and marketed under product code of "IDS2 Type") and disintegrated therein, to give rise to microfine colored particles (3).

The microfine colored particles (3), by measurement with a Coulter Counter (aperture 100 μm), were found to possess an average particle diameter of 5.24 μm and a coefficient of variation of particle diameter of 19.8%. The microfine colored particles (3) were used in their unmodified forms as an electrophotographic toner to produce images by the use of an electrostatic copier (produced by Canon Co., Ltd. and marketed under product code of "NP-5000"). The results are shown in Table 1.

EXAMPLE 4

A carbon black graft polymer was obtained by following the procedure of Example 1. In the same flask as described above, 8,970 parts of deionized water having dissolved therein 10 parts of an anionic surfactant (produced by Daiichi Seiyaku Co., Ltd. and marketed under trademark designation of "Hitenol N-08") was place. In the water, a mixture prepared in advance by combining 500 parts of carbon black graft polymer, 20 parts of azo-bis-isobutylonitrile, and 10 parts of 2,2'-azo-bis-(2,4-dimethylvaleronitrile) with a component consisting of 800 parts of styrene, 150 parts of n-butyl acrylate, and 50 parts of polybutadiene (produced by Nippon Soda Co., Ltd. and marketed under trademark designation of "NISSO-PB-B-3000") was treated in the same manner as in Example 1, to give rise to a suspension (4) of microfine globular colored particles having a conversion of 92%, an average particle diameter of 6.30 μm, and a coefficient of variation of particle diameter of 19.5%.

When the suspension of microfine globular colored particle thus produced was heat treated at 90° C. for two hours, they produced blocks of fused particles. These blocks were separated by filtration and dried by the use of a hot air drier at 50° C. for 10 hours, to afford 1,500 parts of blocks having the individual particles fused in a state retaining the boundary surface thereof partially, possessing a bulk density of 0.31 $kg/cm^3$, and assuming the appearance of a cake of millet seeds glued with thick malt jelly. The block were fed at a rate of 17 kg/hr to an ultrasonic jet pulverizing device (produced by Nippon Pneumatic Kogyo K. K. and marketed under product code of "IDS2 Type") and disintegrated therein, to produce microfine colored particles (4).

The microfine colored particles (4), by measurement with a Coulter Counter (aperture 100 μm), were found to have an average particle diameter of 6.14 μm and a coefficient of variation of particle diameter of 20.8%. The microfine colored particles (4) were used in their unmodified forms as an electrophotographic toner to produce images with an electrostatic copier (produced by Ricoh Co., Ltd. and marketed under product code of "Type 4060"). The results are shown in Table 1.

EXAMPLE 5

In the same flask as used in Example 1, 8,970 parts of deionized water having dissolved therein 5 parts of sodium dodecylbenzenesulfonate as an anionic surfactant was placed. In the water, a mixture prepared in advance by combining 500 parts of carbon black graft polymer as a coloring agent, 30 parts of azo-bis-isobutylonitrile, and 30 parts of 2,2'-azo-bis-(2,4-dimethyl valeronitrile) with a polymeric monomer component consisting of 800 parts of styrene and 200 parts of n-butyl acrylate was stirred by the used of a mixing device (produced by Tokushu KikaKogyo K. K. and marketed under trademark designation of "T. K. Homomixer") at 8,000 rpm for five minutes, to form a homogeneous suspension.

Then, the suspension was exposed to the blow of nitrogen gas and heated to 65° C., stirred continuously at this temperature for five hours to undergo suspension polymerization, and further heated at 75° C. for one hour, to afford a suspension (5) of microfine globular colored particle having a conversion of 95.0%, an average particle diameter of 5.92 μm, and a coefficient of variation of particle diameter of 23.0%. When the suspension (5) of microfine globular colored particles kept at 75° C. and 200 parts of 1N hydrochloric acid added thereto were heat treated at 85° C. for three hours, blocks of fused particles were obtained. These blocks were separated by filtration and dried by the use of a reduced-pressure drier at 50° C. for eight hours, to afford 1,500 parts of blocks having the individual particles fused in a state retaining the boundary surface thereof intact, possessing a bulk density of 0.35 $g/cm^3$, and assuming the appearance of a cake of millet seeds glued with thick malt jelly. The blocks were fed at a rate of 13 kg/hr to an ultrasonic jet pulverizing device (produced by Nippon Pneumatic Kogy K. K. and marketed under product code of "IDS2 Type") and disintegrated therein, to produce microfine colored particles (5).

The microfine colored particles (5) thus obtained, by measurement with a Coulter Counter (aperture 100 μm), were found to possess an average particle diameter of 5.65 μm and a coefficient of variation of particle diameter of 21.2%. The microfine colored particles (5) were used in their unmodified forms as an electrophotographic toner to produce images with an electrostatic copier (produced by Ricoh Co., Ltd. and marketed under product code of "Type 4060"). The results are shown in Table 1.

EXAMPLE 6

A suspension (6) of microfine globular colored particles having a conversion of 92%, an average particle diameter of 6.02 μm, and a coefficient of variation of particle diameter of 21.2% was obtained by following the procedure of Example 4, except 50 parts of chlorosulfonated polyethylene (produced by E. I. duPont de Nemors & Co. and marketed under trademark designation of "HYPOLON 20") was used in the place of 50 parts of polybutadiene and 30 parts of benzoyl peroxide was used in the place of 20 parts of azo-bis-isobutylonitrile and 10 parts of 2,2'-azo-bis-(2,4-dimethyl valeronitrile). When the suspension (6) of microfine globular colored particle kept at 75° C. and 3 parts of calcium chloride added thereto were heat treated at 95° C. for one hour, blocks of fused particles were formed. These blocks were separated by filtration and dried by the use of a reduced-pressure direr at 50° C. for eight hours, to afford 1,500 parts of blocks having the individual particles fused in a state retaining the boundary surface thereof partially, possessing a bulk density of 0.21 $g/cm^3$, and assuming the appearance of a cake of millet seeds glued with thick malt jelly. The blocks were fed at a rate of 18 kg/hr to an ultrasonic jet pulverizing device (produced by Nippon Pneumatic Kogyo K. K. and marketed under product code of "IDS2 Type") and disintegrated therein, to produce microfine colored particles (6).

The microfine colored particles (6) thus obtained, by measurement with a Coulter Counter (aperture 100 μm), were found to possess an average particle diameter of 6.10 μm and a coefficient of variation of particle diameter of 22.0%. The microfine colored particles (6) were used in their unmodified forms as an electrophotographic toner to produce images with an electrostatic copier (produced by Ricoh Co., Ltd. and marketed under product code of "Type 4060"). The results are shown in Table 1.

EXAMPLE 7

A suspension (7) of microfine globular colored particles having a conversion of 96%, an average particle diameter of 5.75 μm, and a coefficient of variation of particle diameter of 19.5% were obtained by following the procedure of Example 1, except 10 parts of a nonionic surfactant (produced by Sanyo Kasei K. K. and marketed under trademark designation of "Nonipol 200") was used in the place of 5 parts of sodium dodecylbenzenesulfonate as an anionic surfactant. When the suspension kept at 60° C. and 750 parts of heptane added thereto were heat treated for one hour, blocks of fused particles were formed. These blocks were separated by filtration and dried by the use of a hot air drier at 50° C. for 10 hours, to afford 1,500 parts of blocks having the individual particles fused in a state retaining the boundary surface thereof partially, possessing a bulk density of 0.22 $g/cm^3$, and assuming the appearance of a cake of millet seeds glued with thick malt jelly. These blocks were fed at a rate of 15 kg/hr to an ultrasonic jet pulverizing device (produced by Nippon Pneumatic Kogyo K. K. and marketed under product code of "IDS2 Type") and disintegrated therein, to produce microfine colored particles (7).

The microfine colored particles (7) thus obtained, by measurement with a Coulter Counter (aperture 100 μm), were found to possess an average particle diameter of 5.65 μm and a coefficient of variation of particle diameter of 20.7%. The microfine colored particles (7) were used in their unmodified forms as an electrophotographic toner to produce images with an electrostatic copier (produced by Ricoh Co., Ltd. and marketed under product code of "Type 4060"). The results are shown in Table 1.

EXAMPLE 8

The same suspension (1) of microfine globular colored particles was obtained as in Example 1. When the suspension (1) of microfine globular colored particles kept at 75° C. and 500 parts of a dispersion prepared in advance by dispersing in 1,000 parts of deionized water 10 parts of an electroconductive carbon black exhibiting a hydrophobicity index of 12.3 (produced by Ketjen International K. K. and marketed under trademark designation of "Ketjen EC") were heated for one hour, blocks of fused particles were obtained. These blocks were separated by filtration and dried by the use of a hot air drier at 50° C. for 10 hours, to afford 1,500 parts of blocks having the individual particles fused in a state retaining the boundary surface thereof partially, possessing a bulk density of 0.18 $g/cm^3$, and assuming the appearance of a cake of millet seeds glued with thick malt jelly. The blocks were fed at a rate of 16 kg/hr to an ultrasonic jet pulverizing device (produced by Nippon Pneumatic Kogyo K. K. and marketed under product code of "IDS2 Type") and disintegrated therein, to produce microfine colored particles (8).

The microfine colored particles (8) thus produced, by measurement with a Coulter Counter (aperture 100 μm), were found to possess an average particle diameter of 5.78 μm and a coefficient of variation of particle diameter of 17.5%. The microfine colored particles (8) were used in their unmodified forms as an electrophotographic toner to produce images with an electrostatic copier (produced by Ricoh Co., Ltd. and marketed under product code of "Type 4060"). The results are shown in Table 1.

EXAMPLE 9

Blocks of particles were formed by following the procedure of Example 8, except 123.8 parts of a dispersion prepared in advance by dispersing 10 parts of hydrophobic aerosol exhibiting a hydrophobicity index of 50.5 (produced by Nippon Aerosil K. K.) and 5 parts of an electroconductive carbon black exhibiting a hydrophobicity index of 12.3 (produced by Ketjen International K. K. and marketed under trademark designation of "Ketjen EC") in 150 parts of methanol was added instead of adding 500 parts of the aqueous dispersion of Ketjen EC and a heat treatment was additionally formed for 1.5 hours. The blocks were separated by filtration and dried by the use of a reduced-pressure drier at 50° C. for eight hours, to afford 1,500 parts of blocks having the individual particles fused in a state retaining the boundary surface thereof partially, possessing a bulk density of 0.17 $g/cm^3$, and assuming the appearance of a cake of millet seeds glued with thick malt jelly. These blocks were fed at a rate of 20 kg/hr to an ultrasonic jet pulverizing device (produced by Nippon Pneumatic Kogyo K. K. and marketed under product code of "IDS2 Type") and disintegrated therein, to produce microfine colored particles (9).

The microfine colored particles (9) thus produced, by measurement with a Coulter Counter (aperture 100 μm), were found to have an average particle diameter of 5.81 μm and a coefficient of variation of particle diameter of 17.1%. The microfine colored particles (9) were used in their unmodified forms as an electrophotographic toner (9) to produced images with an electrostatic copier (produced by Canon Co., Ltd. and marketed under product code of "NP-5000"). The results are shown in Table 1.

EXAMPLE 10

The same suspension (2) of microfine globular colored particles was obtained as in Example 2. When the suspension (2) of microfine globular colored particles kept at 75° C. and 82.5 parts of a dispersion prepared in advance by dispersing 13 parts of an aqueous-paste charge controling agent containing 35% of a principal component (produced by Orient Kagaku Kogy K. K. and marketed under trademark designation of "Bontron S-34") and 10 parts of a hydrophobic aerosil R972 (produced by Nippon Aerosil K. K.) in 100 parts of methanol were heat treated at 95° C. for one hour, blocks of fused particles were formed. These blocks were separated by filtration and dried by the use of a reduced-pressure drier at 50° C. for eight hours, to afford 1,110 parts of blocks having the individual particles fused in a state retaining the boundary surface thereof partially, possessing a bulk density of 0.26 $g/cm^3$, and assuming the appearance of a cake of millet seeds glued with thick malt jelly. The blocks were fed at a rate of 13 kg/hr to an ultrasonic jet pulverizing device (produced by Nippon Pneumatic Kogyo K. K. and marketed under product code of "IDS2 Type") and disintegrated therein, to produce microfine colored particles (10).

The microfine colored particles (10) thus produced, by measurement with a Coulter Counter (aperture 100 μm), were found to have an average particle diameter of 6.35 μm and a coefficient of variation of particle diameter of 19.0%. This microfine colored particles (10) were used in their unmodified forms as an electrophotographic toner to produce images with an electrostatic copier (produced by Ricoh Co., Ltd. and marketed under product code of "Type 4060"). The results are shown in Table 1.

EXAMPLE 11

The same suspension (3) of microfine globular colored particles was obtained as in Example 3. When the suspension (3) of microfine globular colored particles kept at 75° C. and 110 parts of a dispersion prepared in advance by dispersing 41 parts of an aqueous-paste charge controlling agent containing 35% of a principal component (produced by Orient Kagaku Kogyo K. K. and marketed under trademark designation of "Bontron S34") and 10 parts of aerosil exhibiting a hydrophobicity index of 69.5 (produced by Nippon Aerosil K. K.) in 100 parts of methanol were heat treated at 95° C. for 30 minutes, blocks of fused particles were obtained. These blocks were separated by filtration and dried by the use of a reduced-pressure drier at 50° C. for eight hours, to afford 1700 parts of blocks having the individual particles fused in a state retaining the boundary surface thereof partially, possessing a bulk density of 0.20 g/cm$^3$, and assuming the appearance of a cake of millet seeds glued with thick malt jelly. These blocks were fed at a rate of 20 kg/hr to an ultrasonic jet pulverizing device (produced by Nippon Pneumatic Kogyo K. K. and marketed under product code of "IDS2 Type") and disintegrated therein, to produce microfine colored particles (11).

The microfine colored particles (11) thus produced, by measurement with a Coulter Counter (aperture 100 $\mu$m), were found to have an average particle diameter of 5.24 $\mu$m and a coefficient of variation of particle diameter of 19.8%. The microfine colored particles (11) were used in their unmodified forms as an electrophotographic toner to produce images with an electrostatic copier (produced by Canon Co., Ltd. and marketed under product code of "NP-5000"). The results are shown in Table 1.

EXAMPLE 12

The same suspension (4) of microfine globular colored particles was obtained as in Example 4. When the suspension (4) of microfine globular colored particles and 20 parts of antimony oxide-doped tin oxide (produced by Mitsubishi Metal Corp. and marketed under product code of "T-1") added thereto were heat treated at 90° C. for two hours, blocks of fused particles were obtained. The blocks were separated by filtration and dried by the use of a hot air drier at 50° C. for 10 hours, to afford 1,500 parts of blocks having the individual particles fused in a state retaining the boundary surface thereof partially, possessing a bulk density of 0.30 g/cm$^3$, and assuming the appearance of a cake of millet seeds glued with thick malt jelly. These blocks were fed at a rate of 18 kg/hr to an ultrasonic jet pulverizing device (produced by Nippon Pneumatic Kogyo K. K. and marketed under product code of "IDS2 Type") and disintegrated therein, to produce microfine colored particles (12).

The microfine colored particles (12) thus obtained, by measurement with a Coulter Counter (aperture 100 $\mu$m), were found to possess an average particle diameter of 6.20 $\mu$m and a coefficient of variation of particle diameter of 20.0%. The microfine colored particles (12) were used in their unmodified forms as an electrophotographic toner (12) to produce images with an electrostatic copier (produced by Ricoh Co., Ltd. and marketed under product code of "Type 4060"). The results are shown in Table 1.

EXAMPLE 13

The same suspension (5) of microfine globular colored particles was obtained as in Example 5. To the suspension (5) of microfine globular colored particles, 100 parts of heptane and 100 parts of a dispersion prepared in advance by dispersing in 100 parts of methanol 10 parts of microfine water-insoluble particles produced by treating titanium oxide (produced by Nippon Aerosil K. K. and marketed under product code of "P25") until it acquired a hydrophobicity index of 15 were added. After these additions, the suspension was heat treated at 85° C. for three hours, which resulted in the formation of blocks of fused particles. The blocks were separated by filtration and dried by the use of a reduced-pressure drier at 50° C. for eight hours, to afford 1500 parts of blocks having the individual particles fused in a state retaining the boundary surface thereof partially, possessing a bulk density of 0.34 g/cm$^3$, and assuming the appearance of a cake of millet seeds glued with thick malt jelly. These blocks were fed at a rate of 13 kg/hr to an ultrasonic jet pulverizing device (produced by Nippon Pneumatic Kogyo K. K. and marketed under product code of "IDS2 Type") and disintegrated therein, to produce microfine colored particles (13). The microfine colored particles (13) thus obtained, by measurement with a Coulter Counter (aperture 100 $\mu$m), were found to possess an average particle diameter of 5.73 $\mu$m and a coefficient of variation of particle diameter of 20.5%. The microfine colored particles (13) were used in their unmodified forms as an electrophotographic toner to produce images with an electrostatic copier (produced by Ricoh Co., Ltd. and marketed under product code of "Type 4060"). The results are shown in Table 1.

EXAMPLE 14

The same suspension (6) of microfine globular colored particles was obtained as in Example 6. To the suspension (6) of microfine globular colored particles, 180 parts of a dispersion prepared in advance by dispersing in 150 parts of methanol 15 parts of zirconium oxide (produced by Nippon Shokubai Kagaku Kogy Co., Ltd. and marketed under product code of "NS-3Y") and 15 parts of a powdered magnetic material (produced by Tital Kogyo K. K. and marketed under trademark designation of "Mapico BL-400") were added. After these additions, the suspension was heat treated at 95° C. for one hour, which resulted in the formation of blocks of fused particles. These blocks were separated by filtration and dried by the use of a reduced-pressure drier at 50° C. for eight hours, to afford 1,500 parts of blocks having the individual particles fused in a state retaining the boundary surface thereof intact, possessing a bulk density of 0.19 g/cm$^3$, and assuming the appearance of a cake of millet seeds glued with thick malt jelly. These blocks were fed at a rate of 19.5 kg/hr to an ultrasonic jet pulverizing device (produced by Nippon Pneumatic Kogyo K. K. and marketed under product code of "IDS2 Type") and disintegrated therein, to produce microfine colored particles (14). The microfine colored particles (14) thus obtained, by measurement with a Coulter Counter (aperture 100 $\mu$m), were found to have an average particle diameter of 6.21 $\mu$m and a coefficient of variation of particle diameter of 21.5%. The microfine colored particles (14) were used in their unmodified forms as an electrophotographic toner (14) to produce images with an electrostatic copier (produced by Ricoh Co., Ltd. and marketed under product code of "Type 4060"). The results are shown in Table 1.

EXAMPLE 15

The same suspension (7) of microfine globular colored particles was obtained as in Example 7. To this suspension kept at 60° C., 200 parts of heptane and 313 parts of a dispersion prepared in advance by dispersing in 285 parts of methanol 12 parts of hydrophobic aerosil exhibiting a hydrophobicity index of 64.5 (produced by Nippon Aerosil K. K. and marketed under product code of "R809"), 12 parts of a hydrophobic aerosil exhibiting a hydrophobicity index of 50 (produced by Nippon Aerosil K. K. and marketed under product code of "R805"), and 4.5 parts of an electroconductive carbon black (produced by Ketjen International K.

K. and marketed under trademark designation of "Ketjen EC") were added. After these additions, the suspension was heat treated at 60° C. for 2 hr, which resulted in the formation of blocks of fused particles. The blocks were separated by filtration and dried by the use of a hot air drier at 50° C. for 10 hours, to afford 1,500 parts of blocks having the individual particles fused in a state retaining the boundary surface thereof intact, possessing a bulk density of 0.21 g/$cm^3$, and assuming the appearance of a cake of millet seeds glued with thick malt jelly. These blocks were fed at a rate of 16 kg/hr to an ultrasonic jet pulverizing device (produced by Nippon Pneumatic Kogyo K. K. and marketed under product code of "IDS2Type"), to produce microfine colored particles (15).

The microfine colored particles (15) thus obtained, by measurement with a Coulter Counter (aperture 100 $\mu$m), were found to possess an average particle diameter of 5.65 $\mu$m and a coefficient of variation of particle diameter of 20.7%. The microfine colored particles (15) were used in their unmodified forms as an electrophotographic toner (25) to produce images with an electrostatic copier (produced by Ricoh Co., Ltd. and marketed under product code of "Type 4060"). The results are shown in Table 1.

EXAMPLE 16

A suspension (1') of microfine globular colored particles having an average particle diameter of 5.82 $\mu$m and a coefficient of variation of particle diameter of 20.5% was obtained by following the procedure of Example 1, except the mixture containing the polymeric monomer component, instead of being treated with the T. K. Homomixer, was passed five times through a mixing device (produced by Ebara Mfg. Co., Ltd. and marketed under trademark designation of "Ebara Milder MDN-303V") operated at 15,000 rpm to form a homogeneous suspension and the suspension polymerization reaction was performed by heating the suspension at 65° C. for 5 hour, and further at 75° C. for two hours. The suspension and 60 parts of an aqueous aluminum chloride solution containing 5% of the principal component were mixed to induce cohesion of microfine globular colored particles. The resultant cake was separated by use of a centrifuge and then heated and humidified for 10 minutes in an atmosphere kept at 90° C. and a relative humidity of 98%, to form a mass of blocks of fused particles. The blocks were dried at 50° C., to afford 1,500 parts of blocks having the individual particles fused in a state retaining the boundary surface thereof partially, possessing a bulk density of 0.4 g/$cm^3$, and assuming the appearance of a cake of millet seeds glued with thick malt jelly. These blocks were coarsely crushed and then fed at a rate of 11 kg/hr to an ultrasonic jet pulverizing device (produced by Nippon Pneumatic Kogyo K. K. and marketed under product code of "IDS2 Type") and disintegrated therein, to produce microfine colored particles (16).

The microfine colored particles (16) thus obtained, by measurement with a Coulter Counter (aperture 100 $\mu$m), were found to possess an average particle diameter of 5.65 $\mu$m and a coefficient of variation of particle diameter of 18.8%. This microfine colored particles (16) were used in their unmodified forms as an electrophotographic toner (16) to produce images with an electrostatic copier (produced by Ricoh Co., Ltd. and marketed under product code of "Type 4060"). The results are shown in Table 1.

EXAMPLE 17

A suspension (2') of microfine globular colored particles having an average particle diameter of 6.42 $\mu$m and a coefficient of variation of particle diameter of 21.3% was obtained by following the procedure of Example 2, except the reaction of suspension polymerization was carried out at 65° C. for five hours and then at 75° C. for 2 hours. The suspension (2') of microfine globular colored particles kept at 75° C. was combined first with 13 parts of an aqueous-paste charge controling agent containing 35% of a principal component (produced by Orient Kagaku Kogyo K. K. and marketed under trademark designation of "Bontron S-34") and then with 1,110 parts of methanol to induce sedimentation of microfine globular colored particles. The resultant cake was separated by filtration and heated and humidified for 20 minutes in an atmosphere kept at 80° C. and a relative humidity of 90%, to form a mass of blocks of fused particles. These blocks were dried at 50° C., to afford 1,110 parts of blocks having the individual particles fused in a state retaining the boundary surface thereof partially, possessing a bulk density of 0.70 g/$cm^3$, and assuming the appearance of a cake of millet seeds glued with thick malt jelly. These blocks were coarsely crushed and then fed at a rate of 8.0 kg/hr to an ultrasonic jet pulverizing device (produced by Nippon Pneumatic Kogyo K. K. and marketed under product code of "IDS2 Type") and disintegrated therein, to produce microfine colored particles (17). The microfine colored particles (17) thus obtained, by measurement with a Coulter Counter (aperture 100 $\mu$m), were found to possess an average particle diameter of 6.15 $\mu$m and a coefficient of variation of particle diameter of 23.3%. The microfine colored particles (17) were used in their unmodified forms as an electrophotographic toner (17) to produce images with an electrostatic copier (produced by Ricoh Co., Ltd. and marketed under product code of "Type 4060"). The results are shown in Table 1.

EXAMPLE 18

A suspension (3') of microfine globular colored particles possessing an average particle diameter of 5.43 $\mu$m and a coefficient of variation of particle diameter of 22.5% was obtained by following the procedure of Example 3, except the reaction of suspension polymerization was carried out first at 65° C. for five hours and then at 75° C. for two hours. The suspension (3') of microfine globular colored particles kept at 75° C. was combined with 41 parts of an aqueous-paste charge controling agent containing 35% of a principal component (produced by Orient Kagaku Kogyo K. K. and marketed under trademark designation of "Bontron S-34") and 60 parts of an aqueous aluminum chloride solution containing 5% of a principal component to induce cohesion of microfine globular colored particles. The resultant cake was separated by filtration and then heated and humidified for five minutes in an atmosphere kept at 95° C. and a relative humidity of 100%, to form a mass of blocks of fused particles. These blocks were dried at 50° C., to afford 1,700 parts of blocks having the individual particles fused in a state retaining the boundary surface thereof partially, possessing a bulk density of 0.35 g/$cm^3$, and assuming the appearance of a cake of millet seeds glued with thick malt jelly. The blocks were coarsely crushed and then fed at a rate of 13 kg/hr to an ultrasonic jet pulverizing device (produced by Nippon Pneumatic Kogyo K. K. and marketed under product code of "IDS3 Type") and disintegrated therein, to produce microfine colored particles (3).

The microfine colored particles (18) thus obtained, by measurement with a Coulter Counter (aperture 100 $\mu$m), were found to possess an average particle diameter of 5.22 $\mu$m and a coefficient of variation of particle diameter of 19.3%. The microfine colored particles (18) were used in its unmodified form as an electrophotographic toner (18) to produce images with an electrostatic copier (produced by Canon Co., Ltd. and marketed under product code of "NP-500"). The results are shown in Table 1.

EXAMPLE 19

A suspension (4') of microfine globular colored particles having an average particle diameter of 6.30 μm and a coefficient of variation of particle diameter of 19.5% was obtained by following the procedure of Example 4, except the reaction of suspension polymerization was carried out first at 65° C. for five hours and then at 75° C. for two hours. The suspension (4') of microfine globular colored particles was combined with 60 parts of an aqueous aluminum chloride solution containing 5% of a principal component to induce cohesion of the microfine globular colored particles. The resultant cake was separated by filtration and heated and humidified for 20 minutes in an atmosphere kept at 85° C. and a relative humidity of 100%, to form a mass of blocks of fused particles. These blocks were dried at 50° C., to afford 1,500 parts of blocks having the individual particles fused in a state retaining the boundary surface thereof partially, possessing a bulk density of 0.31 g/cm$^3$, and assuming the appearance of a cake of millet seeds glued with thick malt jelly. These blocks were coarsely crushed and then fed at a rate of 15 kg/hr to an ultrasonic jet pulverizing device (produced by Nippon Pneumatic Kogyo K. K. and marketed under product code of "IDS2 Type") and disintegrated therein, to produce microfine colored particles (19).

The microfine colored particles (19) thus obtained, by measurement with a Coulter Counter (aperture 100 μm), were found to possess an average particle diameter of 6.24 μm and a coefficient of variation of particle diameter of 20.8%. The microfine colored particles (19) were used in their unmodified forms as an electrophotographic toner (19) to produce images with an electrostatic copier (produced by Ricoh Co., Ltd. and marketed under product code of "Type 4060"). The results are shown in Table 1.

EXAMPLE 20

A suspension (5') of microfine globular colored particles having an average particle diameter of 5.92 μm and a coefficient of variation of particle diameter of 23.0% was obtained by following the procedure of Example 5, except the reaction of suspension polymerization was carried out first at 65° C. for five hours and then at 75° C. for two hours. This suspension was combined with 1,500 parts of methanol to induce sedimentation of the microfine globular colored particles. The resultant cake was separated by filtration and heated and humidified for 35 minutes in an atmosphere kept at 70° C. and a relative humidity of 95%, to form a mass of blocks of fused particles. These blocks were dried at 50° C., to afford 1,500 parts of blocks having the individual particles fused in a state retaining the boundary surface thereof partially, possessing a bulk density of 0.55 g/cm$^3$, and assuming the appearance of a cake of millet seeds glued with thick malt jelly. These blocks were coarsely crushed and then fed at a rate of 10.5 kg/hr to an ultrasonic jet pulverizing device (produced by Nippon Pneumatic Kogyo K. K. and marketed under product code of "IDS2 Type") and disintegrated therein, to produce microfine colored particles (20).

The microfine colored particles (20) thus obtained, by measurement with a Coulter Counter (aperture 100 μm), were found to possess an average particle diameter of 5.67 μm and a coefficient of variation of particle diameter of 21.5%. The microfine colored particles (20) were used in their unmodified forms as an electrophotographic toner (20) to produce images with an electrostatic copier (produced by Ricoh Co., Ltd. and marketed under product code of "Type 4060"). The results are shown in Table 1.

EXAMPLE 21

A suspension (6') of microfine globular colored particles having an average particle diameter of 6.02 μm and a coefficient of variation of particle diameter of 21.2% was obtained by following the procedure of Example 6, except the reaction suspension polymerization was carried out first at 65° C. for five hours and then at 75° C. for two hours. This suspension was combined with 180 parts of an aqueous calcium chloride solution containing 5% of a principal component to induce cohesion of microfine globular colored particles. The resultant cake was separated by filtration and heated and humidified for three minutes in an atmosphere kept at 110° C. and a relative humidity of 100%, to form a mass of blocks of fused particles. These blocks were dried at 50° C., to afford 1500 parts of blocks having the individual particles fused in a state retaining the boundary surface thereof partially, possessing a bulk density of 0.51 g/cm$^3$, and assuming the appearance of a cake of millet seeds glued with thick malt jelly. These blocks were coarsely crushed and then fed at a rate of 9.5 kg/hr to an ultrasonic jet pulverizing device (produced by Nippon Pneumatic Kogyo K. K. and marketed under product code of "DIS2 Type") and disintegrated therein, to produce microfine colored particles (21).

The microfine colored particles (21) thus obtained, by measurement with a Coulter Counter (aperture 100 μm), were found to possess an average particle diameter of 6.15 μm and a coefficient of variation of particle diameter of 22.5%. The microfine colored particles (21) were used in their unmodified forms as an electrophotographic toner (21) to produce images with an electrostatic copier (produced by Ricoh Co., Ltd. and marketed under product code of "Type 4060"). The results are shown in Table 1.

EXAMPLE 22

A suspension (7') of microfine globular colored particles having an average particle diameter of 5.75 μm and a coefficient of variation of particle diameter of 19.5% was obtained by following the procedure of Example 7, except the reaction of suspension polymerization was carried out first at 65° C. for five hours and then at 75° C. for two hours. This suspension was combined with 180 parts of an aqueous Aluminium chloride solution containing 5% of a principal component to induce cohesion of microfine globular colored particles. The resultant cake was separated by filtration and heated and humidified for 15 minutes in an atmosphere kept at 85° C. and a relative humidity of 90%, to form a mass of blocks of fused particles. These blocks were dried at 50° C., to afford 1,500 parts of blocks having the individual particles fused in a state retaining the boundary surface thereof partially, possessing a bulk density of 0.62 g/cm$^3$, and assuming the appearance of a cake of millet seeds glued with thick malt jelly. These blocks were coarsely crushed and then fed at a rate of 7 kg/hr to an ultrasonic jet pulverizing device (produced by Nippon Pneumatic Kogyo K. K. and marketed under product code of "IDS2 Type") and disintegrated therein, to produce microfine colored particles (22).

The microfine colored particles (22) thus obtained, by measurement with a Coulter Counter (aperture 100 μm), were found to possess an average particle diameter of 5.65 μm and a coefficient of variation of particle diameter of 21.7%. The microfine colored particles (22) were used in their unmodified forms as an electrophotographic toner (22) to produce images with an electrostatic copier (produced by Ricoh Co., Ltd. and marketed under product code of "Type 4060"). The results are shown in Table 1.

EXAMPLE 23

A cake of solids of fused particles was obtained by following the procedure of Example 16, except 82.5 parts of a dispersion of 10 parts of a hydrophobic aerosil (produced by Nippon Aerosil K. K. and marketed under product code of "R972") in 100 parts of methanol was used in the place of 60 parts of an aqueous aluminum chloride solution containing 5% of a principal component.

Thereafter, by following the procedure of Example 16, there were obtained 1,500 parts of blocks having the individual particles fused in a state retaining the boundary surface thereof partially, possessing a bulk density of 0.39 $g/cm^3$, and assuming the appearance of a cake of millet seeds glued with thick malt jelly. The blocks were coarsely crushed and then fed at a rate of 10 kg/hr to an ultrasonic jet pulverizing device (produced by Nippon Pneumatic Kogyo K. K. and marketed under product code of "IDS2 Type") and disintegrated therein, to produce microfine colored particles (23).

The microfine colored particles (23) thus obtained, by measurement with a Coulter Counter (aperture 100 μm), were found to possess an average particle diameter of 5.64 μm and a coefficient of variation of particle diameter of 18.7%. The microfine colored particles (23) were used in their unmodified forms in an electrophotographic toner (23) to produce images with an electrostatic copier (produced by Ricoh Co., Ltd. and marketed under product code of "Type 4060"). The results are shown in Table 1.

Separately, a cake was obtained by following the procedure described above in effecting the cohesion of microfine globular colored particles and the separation thereof by filtration. This cake, without undergoing the heating and humidifying treatments, was dried to form blocks having a bulk density of 0.33 $g/cm^3$. The blocks were disintegrated by the use of a hammer mill, to produce microfine colored particles (23'). The microfine colored particles each had very high spherality. The microfine colored particles (23') were determined for triboelectricity. The results are shown in Table 2.

EXAMPLE 24

A suspension (1') of microfine globular colored particles was obtained by following the procedure of Example 8. This suspension was combined with 60 parts of an aqueous aluminum chloride solution containing 5% of a principal component to induce cohesion of the microfine globular colored particles. The blocks of particles consequently formed were filtered with a continuous type suction filter. The cake obtained on the filter was washed and, at the same time, heated by continuous addition thereto of 5,000 parts of hot water at 85° C., to form a mass of blocks of fused particles. These blocks were dried at 50° C., to afford 1,500 parts of blocks having the individual particles fused in a state retaining the boundary surface thereof partially, possessing a bulk density of 0.42 $g/cm^3$, and assuming the appearance of a cake of millet seeds glued with thick malt jelly. The blocks were coarsely crushed and then fed at a rate of 11 kg/hr to an ultrasonic jet pulverizing device (produced by Nippon Pneumatic Kogyo K. K. and marketed under product code of "IDS2 Type") and disintegrated therein, to produce microfine colored particles (24).

The microfine colored particles (24) thus obtained, by measurement with a Coulter Counter (aperture 100 μm), were found to possess an average particle diameter of 5.60 μm and a coefficient of variation of particle diameter of 18.7%. The microfine colored particles (24) were used in their unmodified forms as an electrophotographic toner (24) to produce images with an electrostatic copier (produced by Ricoh Co., Ltd. and marketed under product code of "Type 4060"). The results are shown in Table 1.

EXAMPLE 25

A suspension (2') of microfine globular colored particles was obtained by following the procedure of Example 10. The suspension (2') of microfine globular colored particles was combined first with 13 parts of an aqueous-paste charge controlling agent containing 35% of a principal component (produced by Orient kagaku Kogyo K. K. and marketed under trademark designation of "Bontron S-34") and then with 1,110 parts of methanol to induce sedimentation of the microfine globular colored particles. A mass of sedimented particles was filtered with a continuous type suction filter. The cake stopped on the filter was heated by continuous addition thereto of 4,000 parts of hot water at 80° C., to form a mass of blocks of fused particles. The blocks were dried at 50° C., to afford 1,110 parts of blocks having the individual particles fused in a state retaining the boundary surface thereof partially, possessing a bulk density of 0.70 $g/cm^3$, and assuming the appearance of a cake of millet seeds glued with thick malt jelly. The blocks were coarsely crushed and fed at a rate of 8.0 kg/hr to an ultrasonic jet pulverizing device (produced by Nippon Pneumatic Kogyo K. K. and marketed under product code of "IDS2 Type") and disintegrated therein, to produce microfine colored particles (25).

The microfine colored particles (25) thus obtained, by measurement with a Coulter Counter (aperture 100 μm), were found to possess an average particle diameter of 6.18 μm and a coefficient of variation of particle diameter of 23.0%. The microfine colored particles (25) were used in their unmodified forms as an electrophotographic toner (25) to produce images with an electrostatic copier (produced by Ricoh Co. Ltd. and marketed under product code of "Type 4060"). The results are shown in Table 1.

EXAMPLE 26

A suspension (3') of microfine globular colored particles was obtained by following the procedure of Example 11. The suspension (3') of microfine globular colored particles was combined with 41 parts of an aqueous-paste charge controling agent containing 35% of a principal component (produced by Orient Kagaku Kogyo Co., Ltd. and marketed under trademark designation of "Bontron S-34") and 60 parts of an aqueous aluminum chloride solution containing 5% of a principal component to induce cohesion of the microfine globular colored particles. The blocks of particles consequently formed were filtered with a continuous pressure filter. The cake stopped on the filter was washed and, at the same time, heated by continuous addition thereto of 3,000 parts of hot water at 110° C., to form a mass of blocks of fused particles. These blocks were dried at 50° C., to afford 1,700 parts of blocks having the individual particles fused in a state retaining the boundary surface thereof partially, possessing a bulk density of 0.35 $g/cm^3$, and assuming the appearance of a cake of millet seeds glued with thick malt jelly. The blocks were coarsely crushed and then fed at a rate of 13 kg/hr to an ultrasonic jet pulverizing device (produced by Nippon Pneumatic Kogyo K. K. and marketed under product code of "IDS2 Type") and disintegrated therein, to produce microfine colored particles (26).

The microfine colored particles (26) thus obtained, by measurement with a Coulter Counter (aperture 100 $\mu$m), were found to possess an average particle diameter of 5.24 $\mu$m and a coefficient of variation of particle diameter of 19.0%. The microfine colored particles (26) were used in their unmodified forms as an electrophotographic toner (26) to produce images with an electrostatic copier (produced by Canon Co., Ltd. and marketed under product code of "NP-5000"). The results are shown in Table 1.

EXAMPLE 27

A suspension (4') of microfine globular colored particles was obtained by following the procedure of Example 12. The suspension (4') of microfine globular colored particles was combined with 60 parts of an aqueous aluminum chloride solution containing 5% of a principal component to induce cohesion of the microfine globular colored particles. The blocks of fused particles consequently obtained were subjected to separation with a centrifugal separator. The resultant cake stopped on the centrifugal separator was washed and, at the same time, heated by continuous addition thereto of 4,500 parts of hot water at 85° C., to form a mass of blocks of fused particles. These blocks were dried at 50° C., to afford 1,500 parts of blocks having the individual particles fused in a state retaining the boundary surface thereof partially, possessing a bulk density of 0.33 g/cm$^3$, and assuming the appearance of a cake of millet seeds glued with thick malt jelly. The blocks were coarsely crushed and then fed at a rate of 15 kg/hr to an ultrasonic jet pulverizing device (produced by Nippon Pneumatic Kogyo K. K. and marketed under product code of "IDS2 Type") and disintegrated therein, to produce microfine colored particles (27).

The microfine colored particles (27) thus obtained, by measurement with a Coulter Counter (aperture 100 $\mu$m), were found to possess an average particle diameter of 6.23 $\mu$m and a coefficient of variation of particle diameter of 20.5%. The microfine colored particles (27) were used in their unmodified forms as an electrophotographic toner (27) to produce images with an electrostatic copier (produced by Ricoh Co., Ltd. and marketed under product code of "Type 4060"). The results are shown in Table 1.

EXAMPLE 28

A suspension (5') of microfine globular colored particles was obtained by following the procedure of Example 13. This suspension was combined with 1,500 parts of methanol to induce sedimentation of the microfine globular colored particles. The blocks of particles consequently formed were subjected to filtration with a centrifugal separator. The cake consequently stopped on the centrifugal separator was washed and, at the same time, heated by continuous addition thereto of 6,000 parts of hot water at 75° C., to form a mass of blocks of fused particles. These blocks were dried at 50° C., to afford 1,500 parts of blocks having the individual particles fused in a state retaining the boundary surface thereof partially, possessing a bulk density of 0.55 g/cm$^3$, and assuming the appearance of a cake of millet seeds glued with thick malt jelly. The blocks were coarsely crushed and then fed at a rate of 10.5 kg/hr to an ultrasonic jet pulverizing device (produced by Nippon Pneumatic Kogyo K. K. and marketed under a product code of "IDS2 Type") and disintegrated therein, to produce microfine colored particles (28).

The microfine colored particles (28) thus obtained, by measurement with A Coulter Counter (aperture 100 $\mu$m), were found to possess an average particle diameter of 5.65 $\mu$m and a coefficient of variation of particle diameter of 21.6%. This microfine colored particles (28) were used in their unmodified forms as an electrophotographic toner (28) to produce images with an electrostatic copier (produced by Ricoh Co., Ltd. and marketed under product code of "Type 4060"). The results are shown in Table 1.

EXAMPLE 29

A suspension (6') of microfine globular colored particles was obtained by following the procedure of Example 14. This suspension (6') was combined with 180 parts of an aqueous calcium chloride solution containing 5% of a principal component to induce cohesion. The blocks of particles consequently formed were subjected to filtration with a continuous pressure filter. The particles stopped on the filter were washed and, at the same time, heated by continuous addition thereto of 4,000 parts of hot water at 115° C., to form a mass of blocks of fused particles. These blocks were dried at 50° C., to afford 1,500 parts of blocks having the individual particles fused in a state retaining the boundary surface thereof partially, possessing a bulk density of 0.58 g/cm$^3$, and assuming the appearance of a cake of millet seeds glued with thick malt jelly. The blocks were coarsely crushed and then fed at a rate of 9.5 kg/hr to an ultrasonic jet pulverizing device (produced by Nippon Pneumatic Kogyo K. K. and marketed under product code of "IDS2 Type") and disintegrated therein, to produce microfine colored particles (29).

The microfine colored particles (29) thus obtained, by measurement with a Coulter Counter (aperture 100 $\mu$m), were found to possess an average particle diameter of 6.12 $\mu$m and a coefficient of variation of particle diameter of 22.3%. The microfine colored particles (29) were used in their unmodified forms as an electrophotographic toner (29) to produce images with an electrostatic copier (produced by Ricoh Co., Ltd. and marketed under product code of "Type 4060"). The results are shown in Table 1.

EXAMPLE 30

A suspension (7') of microfine globular colored particles was obtained by following the procedure of Example 15. This suspension (7') was combined with 1,500 parts of methanol and 1,000 parts of industrial grade ethanol to induce sedimentation of the colored particles. The sedimented particles were subjected to filtration with a continuous suction filter. The cake consequently stopped on the filter was heated by continuous addition of 2,500 parts of hot water at 90° C., to form a mass of blocks of fused particles. These blocks were dried at 50° C., to afford 1,500 parts of blocks having the individual particles fused in a state retaining the boundary surface thereof partially, possessing a bulk density of 0.62 g/cm$^3$, and assuming the appearance of a cake of millet seeds glued with thick malt jelly. The blocks were coarsely crushed and then fed at a rate of 7 kg/hr to an ultrasonic jet pulverizing device (produced by Nippon Pneumatic Kogyo K. K. and marketed under product code of "IDS2 Type") and disintegrated therein, to produce microfine colored particles (30).

The microfine colored particles (30) thus obtained, by measurement with a Coulter Counter (aperture 100 $\mu$m), were found to possess an average particle diameter of 5.61 $\mu$m and a coefficient of variation of particle diameter of 21.5%. The microfine colored particles (30) were used in their unmodified forms as an electrophotographic toner (30) to produce images with an electrostatic copier (produced by Ricoh Co., Ltd. and marketed under product code of "Type 4060"). The results are shown in Table 1.

EXAMPLE 31

A cake of blocks of fused particles was obtained by following the procedure of Example 24 in effecting the cohesion of microfine globular colored particles and the separation of the fused particles by filtration, except 143 parts of a dispersion prepared in advance by dispersing 10 parts of a hydrophobic aerosil (produced by Nippon Aerosil K. K. and marketed under product code of "R972") and 3 parts of an electroconductive carbon black Ketjen EC (produced by Ketjen International K.K.) in 130 parts of methanol was used in the place of 60 parts of the aqueous aluminum chloride solution containing 5% of a principal component.

Thereafter, 1,500 parts of blocks having the individual particles fused in a state retaining the boundary surface thereof partially, possessing a bulk density of 0.30 $g/cm^3$, and assuming the appearance of a cake of millet seeds glued with thick malt jelly were obtained by following the procedure of Example 24. The blocks were coarsely crushed and then fed at a rate of 12 kg/hr to an ultrasonic jet pulverizing device (produced by Nippon Pneumatic Kogyo K. K. and marketed under product code of "IDS2 Type") and disintegrated therein, to produce microfine colored particles (31). The microfine colored particles (31) thus obtained, by measurement with a Coulter Counter (aperture 100 $\mu$m), were found to possess an average particle diameter of 5.45 $\mu$m and a coefficient of variation of particle diameter of 17.8%. The microfine colored particles (31) were used in their unmodified forms as an electrophotographic toner (31) to produce images with an electrostatic copier (produced by Ricoh Co., Ltd. and marketed under product code of "Type4060"). The results are shown in Table 1.

Separately, a cake of blocks of fused particles was obtained by following the procedure described above in effecting the cohesion of microfine colored particles and the separation thereof by filtration. When this cake was dried without preliminarily undergoing the heating and humidifying treatments, there were formed blocks which had a bulk density of 0.26 $g/cm^3$. This cake was disintegrated by the use of a hammer mill, to produce microfine colored particles (31'). The microfine colored particles each had extremely high spherality. The microfine colored particles (31') were determined for triboelectricity. The results are shown in Table 2.

Control 1

Blocks of fused particles were formed by keeping 10,480 parts of the suspension (4) of microfine globular colored particles obtained Example 4 at 75° C., adding 5 pars of aluminum chloride to the hot suspension, and heat treating the resultant mixture at 150° C. under an increased pressure for 30 minutes. These blocks were separated by filtration, dried by the use of a reduced-pressure drier at 50° C. for eight hours, coarsely crushed, fed at a rate of 4 kg/hr to the same ultrasonic jet pulverizing device and disintegrated therein, to produce 1,500 parts of microfine colored particles (a) for comparison.

The microfine colored particles (a) were tested for properties as a particulate substance. The microfine colored particles (a) were used in their unmodified forms as an electrophotographic toner (a) for comparison to produce images with an electrostatic copier (produced by Ricoh Co., Ltd. and marketed under product code of "Type 4060"). The results are shown in Table 1.

Control 2

A suspension of microfine globular colored particles was obtained by following the procedure of Example 4, except the reaction of suspension polymerization was carried out at 65° C. for four hours and the conversion, therefore, was 86%. When the suspension of microfine globular colored particles was further heat treated at 90° C. for two hours, there was formed a large aggregate of microfine globular colored particles as a whole. The aggregate did not easily succumb to the subsequent treatments.

Control 3

A toner mass was obtained by premixing 2,228 parts of styrene-acryl resin (produced by Sanyo Kasei K. K. and marketed under product code of "TB-1000F"), 187 parts of carbon black (produced by Mitsubishi Chemical Industry Co., Ltd. and marketed under product code of "MA-100R"), and 25 parts of a charge controlling agent (produced by Hodogaya Chemical Co., Ltd. and marketed under trademark designation of "Aizen Spilon Black TRH") by the use of a pressure kneader at 150° C. for 30 minutes and cooling the resultant premix. The toner mass was coarsely crushed with a coarse crushing device into particles 0.1 to 2 mm in diameter, the resultant coarse toner particles were fed at a rate of 5 kg/hr to the same ultrasonic jet pulverizing device as used in Example 1 and finely disintegrated therein, and the resultant microfine toner particles were classified with a wind classifier (produced b Nippon Pneumatic Kogyo K. K. and marketed under product code of "DS-2 Type"), to produce 1,500 parts of microfine colored particles (b) for comparison.

The microfine colored particles (b) for comparison were tested for properties as a particulate substance. The microfine colored particles (b) for comparison were used in their unmodified forms as an electrophotographic toner (b) to produce images with an electrostatic copier (produced by Ricoh Co., Ltd. and marketed under product code of "Type 4060"). The results are shown in Table 1.

Control 4

A mass of blocks of fused particles was formed by preparing a cake of microfine globular colored particles in accordance with the procedure of Example 19 and heat treating this cake in a compressed atmosphere kept at 140° C. and a relative humidity of 100%. By drying this mass at 50° C., 1,500 parts of blocks were obtained. By coarsely crushing these blocks and then feeding the crushed particles at a rate of 2 kg/hr to the same device as used in Example 4 and disintegrating them therein, there was produced microfine colored particles (c) for comparison.

The microfine colored particles (c) for comparison were tested for properties as a particulate substance. The microfine colored particles (a) for comparison were used in their unmodified forms as an electrophotographic toner (c) to produce images with an electrostatic copier (produced by Ricoh Co., Ltd. and marketed under product code of "Type 4060"). The results are shown in Table 1.

Control 5

A filtered cake of microfine globular colored particles was obtained by following the procedure of Example 19. When this filtered cake was heated and humidified for 20 minutes in an atmosphere kept at 85° C. and a relative humidity of 60%, there were formed blocks which had the component particles thereof left virtually unfused. By drying the resultant mass of blocks at 50° C., there were formed 1,500 parts of blocks. By coarsely crushing the blocks and feeding the coarse particles at a rate of 20 kg/hr to the same device as used in Example 4 and disintegrating them therein, there was produced microfine colored particles (d) for comparison. By examination of a scanning electron micrograph of the microfine colored particles (d) for comparison, it was found that not less than 90% of the microfine colored particles (d) had spheric shapes, indicating total absence of any discernible effect of heating and humidifying treatments.

The microfine colored particles (d) for comparison were tested for properties as a particulate substance. The microfine colored particles (d) for comparison were used as an electrophotographic toner (d) to produce images with an electrostatic copier (produced by Ricoh Co., Ltd. and marketed under product code of "Type 4060"). The results are shown in Table 1.

Control 6

A liquid containing aggregates of microfine spheric colored particles was obtained by the procedure of Example 27. This liquid was subjected to separation by filtration by the use of a continuous pressure filter. The resultant cake stopped on the filter was washed and, at the same time, heated by continuous addition thereto of 3,000 parts of hot water at 135° C., to form a mass of blocks of fused particles. By drying this mass at 50° C., there were obtained 1,500 parts of blocks. By coarsely crushing the blocks, feeding the coarse particles at a rate of 2 kg/hr to the same device as used in Example 27 and disintegrating them therein, to produce microfine colored particles (e) for comparison.

The microfine colored particles (e) for comparison were tested for properties as a particulate substance. The microfine colored particles (e) for comparison were used in their unmodified forms as an electrophotographic toner (e) to produce images with an electrostatic copier (produced by Ricoh Co., Ltd. and marketed under product code of "Type 4060"). The results are shown in Table 1.

Control 7

A liquid containing aggregates of microfine globular colored particles was obtained by the procedure of Example 27. This liquid was subjected to separation by filtration by the use of a centrifuge. The cake consequently stopped on the centrifuge was washed and, at the same time, heated by continued addition thereto of 8,000 parts of hot water at 45° C., to form blocks which had the component particles thereof left substantially unfused. By drying the mass of these blocks at 50° C., there were obtained 1,500 parts of blocks. The blocks were coarsely crushed and then fed at a rate of 20 kg/hr to the same device as used in Example 27 and disintegrated therein, to produce microfine colored particles (f) for comparison. By the examination of a scanning electron micrograph of the microfine colored particles (f) for comparison, it was found that not less than 90% of the microfine colored particles had a globular shape, indicating total absence of any discernible effect of heating and humidifying treatments.

The microfine colored particles (f) for comparison were tested for properties as a particulate substance. The microfine colored particles (f) for comparison were used in their unmodified forms as an electrophotographic toner (f) to produce images with an electrostatic copier (produced by Ricoh Co., Ltd. and marketed under product code of "Type 4060"). The results are shown in Table 1.

Control 8

A suspension (1') obtained by following the procedure of Example 16 was combined with 100 parts of an aqueous aluminum chloride solution containing 5% of a principal component to induce cohesion of the microfine globular colored particles. The resultant cake separated by filtration was dried, without subjecting to heat and humidify treatment to afford blocks possessing a bulk density of 0.23 g/cm$^3$. The blocks were disintegrated by use of hammermill to produce microfine colored particles (g) for comparison. The microfine colored particles (g) were determined for triboelectricity. The results are shown in Table 2.

TABLE 1

| | | | Attributes of Particles (Note 2) | | | | Evaluation of image production (Note 3) | | | | | |
|---|---|---|---|---|---|---|---|---|---|---|---|---|
| | | | | | | | Environmental Condition 23° C. and 60% RH | | | Environmental Condition 30° C. and 90% RH | | |
| | Electrophotographic toner | Amount disintegrated (pulverized) (kg/hr) (Note 1) | Particle diameter (μm) | Coefficient of variation (%) | Amount of triboelectricity (μC/g) | Flowability | Fogging | Repeatability of fine line | Cleanability | Fogging | Repeatability of fine line | Cleanability |
| Example 1 | (1) | 15.0 | 5.87 | 18.7 | −20.1 | ◎ | none | good | fair | none | good | fair |
| Example 2 | (2) | 12.0 | 6.15 | 23.0 | −19.7 | ◎ | none | good | fair | none | good | fair |
| Example 3 | (3) | 18.0 | 5.24 | 19.8 | −23.1 | ◎ | none | good | fair | none | good | fair |
| Example 4 | (4) | 17.0 | 6.14 | 20.8 | −18.7 | ◎ | none | good | fair | none | good | fair |
| Example 5 | (5) | 13.0 | 5.65 | 21.2 | −22.3 | ◎ | none | good | fair | none | good | fair |
| Example 6 | (6) | 18.0 | 6.10 | 22.0 | −19.9 | ◎ | none | good | fair | none | good | fair |
| Example 7 | (7) | 15.0 | 5.65 | 20.7 | −23.1 | ◎ | none | good | fair | none | good | fair |
| Control 1 | Control (a) | 4.0 | 6.22 | 18.3 | −19.5 | ○ | none | fair | fair | seen | bad | fair |
| Control 3 | Control (b) | 5 | 10.05 | 14.3 | −21.5 | ○ | none | bad | fair | none | bad | fair |
| Example 8 | (8) | 16.0 | 5.78 | 17.5 | −16.5 | ◎ | none | good | fair | none | good | fair |
| Example 9 | (9) | 20.0 | 5.81 | 17.1 | −18.0 | ◎ | none | good | fair | none | good | fair |
| Example 10 | (10) | 13.0 | 6.35 | 19.0 | −19.8 | ◎ | none | good | fair | none | good | fair |
| Example 11 | (11) | 20.0 | 5.24 | 19.8 | −21.0 | ◎ | none | good | fair | none | good | fair |
| Example 12 | (12) | 13.0 | 6.20 | 20.0 | −17.6 | ◎ | none | good | fair | none | good | fair |
| Example 13 | (13) | 13.0 | 5.73 | 20.5 | −20.2 | ◎ | none | good | fair | none | good | fair |
| Example 14 | (14) | 19.5 | 6.21 | 21.5 | −18.5 | ◎ | none | good | fair | none | good | fair |
| Example 15 | (15) | 16.0 | 5.65 | 20.7 | −17.5 | ◎ | none | good | fair | none | good | fair |
| Example 16 | (16) | 11 | 5.65 | 18.8 | −20.2 | ◎ | none | good | fair | none | good | fair |
| Example 17 | (17) | 8 | 6.15 | 23.3 | −19.6 | ◎ | none | good | fair | none | good | fair |
| Example 18 | (18) | 13 | 5.22 | 19.3 | | ◎ | none | good | fair | none | good | fair |
| Example 19 | (19) | 15 | 6.24 | 20.8 | −18.7 | ◎ | none | good | fair | none | good | fair |

TABLE 1-continued

| | | | Attributes of Particles (Note 2) | | | | Evaluation of image production (Note 3) | | | | | |
|---|---|---|---|---|---|---|---|---|---|---|---|---|
| | | | | | | | Environmental Condition 23° C. and 60% RH | | | Environmental Condition 30° C. and 90% RH | | |
| | Electro-photo-graphic toner | Amount dis-integrated (pulver-ized) (kg/hr) (Note 1) | Particle diameter (μm) | Coefficient of variation (%) | Amount of triboelectricity (μC/g) | Flow-ability | Fogging | Repeat-ability of fine line | Clean-ability | Fog-ging | Repeat-ability of fine line | Clean-ability |
| Example 20 | (20) | 10.5 | 5.67 | 21.5 | −22.5 | ◎ | none | good | fair | none | good | fair |
| Example 21 | (21) | 9.5 | 6.15 | 22.5 | −19.8 | ◎ | none | good | fair | none | good | fair |
| Example 22 | (22) | 7 | 5.65 | 21.7 | −23.0 | ◎ | none | good | fair | none | good | fair |
| Example 23 | (23) | 10 | 5.64 | 18.7 | −23.5 | ◎ | none | good | fair | none | good | fair |
| Control 4 | Control (c) | 2 | 6.22 | 18.3 | −19.5 | ○ | none | fair | fair | seen | bad | fair |
| Control 5 | Control (d) | 20 | 6.29 | 19.3 | −15.0 | ◎ | none | fair | bad | seen | bad | bad |
| Example 24 | (24) | 11 | 5.60 | 18.7 | −20.2 | ◎ | none | good | fair | none | good | fair |
| Example 25 | (25) | 8 | 6.18 | 23.0 | −19.6 | ◎ | none | good | fair | none | good | fair |
| Example 26 | (26) | 13 | 5.24 | 19.0 | | ◎ | none | good | fair | none | good | fair |
| Example 27 | (27) | 15 | 6.23 | 20.5 | −18.7 | ◎ | none | good | fair | none | good | fair |
| Example 28 | (28) | 10.5 | 5.65 | 21.6 | −22.5 | ◎ | none | good | fair | none | good | fair |
| Example 29 | (29) | 9.5 | 6.12 | 22.3 | −19.8 | ◎ | none | good | fair | none | good | fair |
| Example 30 | (30) | 7 | 5.61 | 21.5 | −23.0 | ◎ | none | good | fair | none | good | fair |
| Example 31 | (31) | 12 | 5.45 | 12.8 | −19.5 | ◎ | none | good | fair | none | good | fair |
| Control 6 | Control (e) | 2 | 6.22 | 18.8 | −19.5 | ○ | none | fair | fair | seen | bad | fair |
| Control 7 | Control (f) | 20 | 6.29 | 19.3 | −15.0 | ◎ | none | fair | bad | seen | bad | bad |

(Note 1)
Amount disintegrated (pulverized) - The amount of a given sample fed to the ultrasonic jet pulverizing device (produced by Nippon Pneumatic Kogyo K. K. and marketed under product code of "IDS2 Type") is reported herein as amount disintegrated (pulverized).
(Note 2)
Particle diameter: Measured with a Coulter Counter (produced by Coulter Electronics Inc and marketed under product code of "TA-II Type").
Coefficient of variation: Measured with a Coulter Counter (produced by Coulter Electronics Inc and marketed under product code of "TA-II").
Amount of triboelectricity: Measured of a mixture of a given sample with iron carrier (produced by Dowa Teppun K. K. and marketed under product code of "DSP-128") with a blow-off powder charging tester (produced by Toshiba Chemical K. K. and marketed under product code of "Model TB-200").
Flowability: The flowability of a given toner was visually evaluated on the four-point scale, wherein
◎: Complete independence and thorough flowability of individual toner particles.
○: Slight aggregation and ordinary flowability of individual toner particles.
Δ: Fair aggregation and inferior flowability of individual toner particles.
X: Heavy aggregation and conspicuously poor flowability of individual toner particles.
(Note 3)
Evaluation of image production - The ability of image production with an electrostatic copier was determined by copying a facsimile test chart No. 1 with a copier (produced by Ricoh Co., Ltd. and marketed under product code of "Type 4060" or produced by Canon Co., Ltd. and marketed under product code of "NP-5000") using a given toner and evaluating the image consequently formed.
Fogging - This phenomenon was determined by the discrimination between the presence and the absence to the smearing of the ground with a given toner.
Repeatability of microfine line - This property was determined by copying a facsimile test chart No. 1 using a given toner and examining the legibility of the copied image.
Cleanability - This property was determined by copying a facsimile test chart No. 1 using a given toner and evaluating the copied image.

TABLE 2

| | Colored particles (23') | Colored particles (31') | Comparative colored particles (g) |
|---|---|---|---|
| Environmental Condition 23° C. and 60% RH | −25.8 | −21.8 | −22.0 |
| Amount of triboelectricity | μC/g | μC/g | μC/g |
| Environmental Condition 30° C. and 90% RH | −25.6 | −20.9 | −12.4 |
| Amount of triboelectricity | μC/g | μC/g | μC/g |

What is claimed is:

1. A method for the recovery of microfine suspended particles from a suspension medium, comprising suspending a polymerizable monomer component suspended in a suspension medium, subjecting the resultant suspension to suspension polymerization thereby forming microfine globular particles having an average particle diameter in the range of from 1 to 100 μm in the suspension medium, adding microfine water-insoluble particles to said suspension of the microfine globular particles thereby causing agglomeration of said microfine globular particles, and mechanically separating said microfine globular particles in the form of an agglomerated lumps from said suspension medium, wherein said microfine water-insoluble particle is one member selected from the group consisting of cross-linked and non-cross-linked organic polymer and resin powders, organic pigments, organic charge-controlling agent providers, wax powders, inorganic pigments, and inorganic oxide powders.

2. A method according to claim 1, wherein said suspension polymerization of the polymerizable monomer component is performed in the presence of a coloring agent and/or a magnetic powder.

3. A method according to claim 1, wherein said microfine water-insoluble particles have a hydrophobicity index of not less than 5.

4. A method according to claim 2, wherein said microfine globular particles are obtained by using a carbon black graft polymer as a coloring agent.

* * * * *